(12) United States Patent
Mei et al.

(10) Patent No.: US 10,142,232 B2
(45) Date of Patent: Nov. 27, 2018

(54) ROUTE SETTING METHOD AND TERMINAL DEVICE

(71) Applicant: Huawei Technologies Co., Ltd., Shenzhen (CN)

(72) Inventors: Jingqing Mei, Beijing (CN); Guoqing Li, Beijing (CN); Xinmiao Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 15/035,525

(22) PCT Filed: Jun. 3, 2014

(86) PCT No.: PCT/CN2014/079103
§ 371 (c)(1),
(2) Date: May 10, 2016

(87) PCT Pub. No.: WO2015/184591
PCT Pub. Date: Dec. 10, 2015

(65) Prior Publication Data
US 2016/0301606 A1    Oct. 13, 2016

(51) Int. Cl.
*H04L 12/741* (2013.01)
*H04W 4/80* (2018.01)
(Continued)

(52) U.S. Cl.
CPC ............ *H04L 45/745* (2013.01); *H04L 45/54* (2013.01); *H04W 4/80* (2018.02); *H04W 12/08* (2013.01); *H04L 45/02* (2013.01); *H04W 12/06* (2013.01)

(58) Field of Classification Search
CPC ........ H04L 45/745; H04L 45/54; H04W 4/80; H04W 12/08
See application file for complete search history.

(56) References Cited

U.S. PATENT DOCUMENTS 9,715,681 B2 *  7/2017  Hammad ............... G06Q 20/12
9,904,919 B2 *  2/2018  Hammad .......... G06Q 20/3674
(Continued)

FOREIGN PATENT DOCUMENTS

CN    102375998 A    3/2012
CN    103222291 A    7/2013
(Continued)

OTHER PUBLICATIONS

Foreign Communication From a Counterpart Application, Japanese Application No. 2016-570270, Japanese Notice of Allowance dated Jan. 16, 2018, 1 page.
(Continued)

*Primary Examiner* — Parth Patel
(74) *Attorney, Agent, or Firm* — Conley Rose, P.C.

(57) ABSTRACT

A route setting method and a terminal device are provided, which relate to the communications field and can avoid use of a host card emulator. The method includes checking whether a newly connected secure element (SE) is an exclusive SE; if the newly connected SE is an exclusive SE, checking whether setting a default routing entry is supported; and if it is detected that setting a default routing entry is not supported, constructing a routing table that includes only a routing entry corresponding to the exclusive SE, and if setting a default routing entry is supported, setting the newly connected SE as a default routing target SE, where the constructed routing table may include or not include the routing entry corresponding to the exclusive SE.

18 Claims, 6 Drawing Sheets

(51) Int. Cl.
*H04W 12/08* (2009.01)
*H04W 12/06* (2009.01)
*H04L 12/751* (2013.01)

(56) References Cited

U.S. PATENT DOCUMENTS

| | | | |
|---|---|---|---|
| 9,911,118 B2* | 3/2018 | Carlson | G06Q 20/38 |
| 2009/0247077 A1* | 10/2009 | Sklovsky | G06F 9/445 |
| | | | 455/41.1 |
| 2010/0227553 A1* | 9/2010 | Charrat | G06Q 20/341 |
| | | | 455/41.1 |
| 2012/0032789 A1 | 2/2012 | Ichimaru et al. | |
| 2012/0040614 A1 | 2/2012 | Teruyama et al. | |
| 2012/0239417 A1* | 9/2012 | Pourfallah | G06Q 50/22 |
| | | | 705/2 |
| 2013/0225073 A1* | 8/2013 | O'Donoghue | H04W 4/80 |
| | | | 455/41.1 |
| 2014/0035727 A1 | 2/2014 | Nguyen | |
| 2014/0096222 A1 | 4/2014 | Colnot | |
| 2014/0108263 A1* | 4/2014 | Ortiz | G06Q 20/3278 |
| | | | 705/71 |
| 2014/0215639 A1* | 7/2014 | Gargiulo | H04W 12/04 |
| | | | 726/28 |
| 2014/0351121 A1* | 11/2014 | Vinson | G06F 21/50 |
| | | | 705/41 |
| 2015/0020160 A1* | 1/2015 | Goncalves | G06Q 20/351 |
| | | | 726/3 |
| 2015/0087427 A1* | 3/2015 | Wane | A63F 13/213 |
| | | | 463/43 |
| 2015/0111495 A1* | 4/2015 | Van Nieuwenhuyze | |
| | | | H04W 40/02 |
| | | | 455/41.1 |
| 2015/0127547 A1* | 5/2015 | Powell | G06Q 20/382 |
| | | | 705/67 |
| 2015/0178724 A1* | 6/2015 | Ngo | H04L 9/0869 |
| | | | 705/71 |
| 2015/0220989 A1* | 8/2015 | Hayes | G06Q 30/0261 |
| | | | 705/14.35 |
| 2015/0235212 A1* | 8/2015 | Ortiz | G06Q 20/40 |
| | | | 705/44 |
| 2015/0262164 A1* | 9/2015 | Ranganathan | G06Q 20/3278 |
| | | | 705/39 |
| 2015/0271677 A1* | 9/2015 | Van Nieuwenhuyze | |
| | | | H04W 12/08 |
| | | | 455/41.1 |
| 2015/0326550 A1* | 11/2015 | Schropfer | H04L 63/08 |
| | | | 726/7 |
| 2015/0332271 A1* | 11/2015 | Collins | G06Q 20/4012 |
| | | | 705/44 |
| 2015/0339664 A1* | 11/2015 | Wong | H04L 9/3234 |
| | | | 705/71 |
| 2016/0019536 A1* | 1/2016 | Ortiz | G06Q 20/3221 |
| | | | 705/67 |
| 2016/0078434 A1* | 3/2016 | Huxham | G07F 19/204 |
| | | | 705/71 |
| 2016/0309287 A1 | 10/2016 | Nguyen | |
| 2017/0006057 A1* | 1/2017 | Perez Lafuente | H04L 67/34 |
| 2017/0132618 A1* | 5/2017 | Hong | G06Q 20/32 |
| 2017/0161735 A1* | 6/2017 | Ortiz | G06Q 20/3829 |

FOREIGN PATENT DOCUMENTS

| | | |
|---|---|---|
| CN | 103714276 A | 4/2014 |
| CN | 103765791 A | 4/2014 |
| JP | 2009147845 A | 7/2009 |
| WO | 2012065643 A1 | 5/2012 |
| WO | 2013092796 A1 | 6/2013 |
| WO | WO2015/147413 * | 10/2015 |

OTHER PUBLICATIONS

"NFC Controller Interface (NCI) Specification," Technical Specification, NFC Forum, NCI 1.0, NFCForum-TS-NCI-1.0, Nov. 6, 2012, 146 pages.
Foreign Communication From a Counterpart Application, PCT Application No. PCT/CN2014/079103, English Translation of International Search Report dated Feb. 17, 2015, 2 pages.
Foreign Communication From a Counterpart Application, PCT Application No. PCT/CN2014/079103, Written Opinion dated Feb. 17, 2015, 4 pages.
"Secure Element Deployment & Host Card Emulation," V1.0, Sim Alliance, Secure Elements Deployment & Host Card, 2014, 13 pages.
Foreign Communication From a Counterpart Application, European Application No. 14893768.3, Extended European Search Report dated Jul. 28, 2016, 9 pages.
Machine Translation and Abstract of Chinese Publication No. CN103765791, dated Apr. 30, 2014, 67 pages.
Foreign Communication From A Counterpart Application, Chinese Application No. 201480003374.7, Chinese Office Action dated Aug. 30, 2018, 7 pages.

* cited by examiner

ROUTE SETTING METHOD AND TERMINAL DEVICE

CROSS-REFERENCE TO RELATED APPLICATIONS

This application is a National Stage of International Application No. PCT/CN2014/079103, filed on Jun. 3, 2014, which is incorporated herein by reference in its entirety.

TECHNICAL FIELD

The present disclosure relates to the communications field, and in particular, to a route setting method and a terminal device.

BACKGROUND

Implementation of a reliable mobile payment depends on a secure and encrypted environment provided by a secure element (SE). Therefore, after an SE is properly used in a terminal, a mobile payment application can be installed on the SE to make a secure mobile payment. In addition to physical chip-based SEs, currently, a host card emulator (HCE) that is implemented by a terminal by using software is also regarded by a near field communication controller (NFCC) as an SE for management.

In some application scenarios, a terminal may expect that one SE, for example, an SE on a universal integrated circuit card (UICC), among multiple SEs is an exclusive SE and that the other SEs are non-exclusive SEs. In this case, when this UICC is connected to the terminal, a near field communication (NFC) communication peer selects, according to an NFC routing mechanism, only an application of the SE on this UICC, and therefore an application of another SE or an application of an HCE cannot be selected by the NFC communication peer. Therefore, it is possible that the terminal is required to allow activation of only the exclusive SE and is also required to deactivate a non-exclusive SE. In the prior art, a central processing unit (CPU) sends an SE setting instruction to the NFCC to control activation/deactivation of an SE, where the SE setting instruction includes an identifier (ID) of the SE that needs to be controlled.

If an exclusive UICC card is installed in the terminal, the HCE may be regarded as a non-exclusive SE, and the terminal should stop routing information received by using an NFC technology to the HCE. Generally, the terminal may implement control on an SE by using a mode setting instruction. Because a target ID of the mode setting instruction cannot be an ID of an HCE, an HCE cannot be deactivated by relying on the mode setting instruction, and an exclusive requirement of a newly connected exclusive SE cannot be ensured.

SUMMARY

Embodiments of the present disclosure provide a route setting method and a terminal device, by using which use of an HCE can be avoided, a routing table can be correctly configured, and normal running of an exclusive SE connected to a terminal can be ensured.

To achieve the foregoing objective, the following technical solutions are used in the embodiments of the present disclosure.

According to a first aspect, a route setting method is disclosed, including checking whether a newly connected SE is an exclusive SE; if the newly connected SE is an exclusive SE, checking whether setting a default routing entry is supported; and if it is detected that setting a default routing entry is not supported, constructing a routing table that includes only a routing entry corresponding to the exclusive SE, and if setting a default routing entry is supported, setting the newly connected SE as a default routing target SE, where the constructed routing table may include or not include the routing entry corresponding to the exclusive SE.

With reference to the first aspect, in a first possible implementation manner of the first aspect, after the checking whether a newly connected SE is an exclusive SE, the method further includes, if the newly connected SE is not an exclusive SE, setting an SE flag to a first value, and if the newly connected SE is an exclusive SE, setting the SE flag to a second value and recording an ID of the newly connected SE, where the first value indicates that currently no exclusive SE is connected to the terminal, and the second value indicates that currently an exclusive SE is connected to the terminal.

With reference to the first aspect, in a second possible implementation manner of the first aspect, the method further includes setting the SE flag, where an initial value of the SE flag is a first value; then before the checking whether a newly connected SE is an exclusive SE, the method further includes determining whether the SE flag is of the first value; and if the SE flag is of the first value, acquiring a current routing table.

With reference to the second possible implementation manner of the first aspect, in a third possible implementation manner of the first aspect, if the newly connected SE is not an exclusive SE, a routing entry corresponding to the newly connected SE is added to the current routing table to construct a routing table; and when setting a default routing entry is supported, it is determined whether the default routing target SE needs to be re-designated, where the constructed routing table may include or not include a routing entry corresponding to the default routing target SE.

With reference to the first aspect, in a fourth possible implementation manner of the first aspect, if an NFCC of the terminal device is capable of deleting a routing entry, after the checking whether a newly connected SE is an exclusive SE, the method further includes checking whether an HCE exists in the terminal device; and if no HCE exists in the terminal device, when setting a default routing entry is not supported, adding the routing entry corresponding to the newly connected exclusive SE to the current routing table to construct a routing table, where if setting a default routing entry is supported, the constructed routing table may include or not include the routing entry corresponding to the newly connected exclusive SE.

With reference to the fourth possible implementation manner of the first aspect, in a fifth possible implementation manner of the first aspect, if an HCE exists in the terminal device, it is checked whether the routing table includes a routing entry whose target is the HCE; and if the routing table does not include the routing entry whose target is the HCE, when setting a default routing entry is not supported, the routing entry corresponding to the newly connected exclusive SE is added to the current routing table to construct a routing table, where if setting a default routing entry is supported, the constructed routing table may include or not include the routing entry corresponding to the newly connected exclusive SE.

With reference to the fifth possible implementation manner of the first aspect, in a sixth possible implementation manner of the first aspect, if the routing table includes the routing entry whose target is the HCE, when it is detected that setting a default routing entry is not supported, routing entries corresponding to the HCE and a non-exclusive SE are deleted from the routing table and the routing entry corresponding to the newly connected SE is written to construct a routing table that includes only the routing entry corresponding to the newly connected exclusive SE, where if setting a default routing entry is supported, the constructed routing table may include or not include the routing entry corresponding to the newly connected exclusive SE.

With reference to the second possible implementation manner of the first aspect, in a seventh possible implementation manner of the first aspect, the method further includes detecting that an SE is removed, and acquiring an ID of the currently removed SE; determining whether the SE flag is of the second value; if the SE flag is of the second value, determining whether the ID of the currently removed SE is the same as an ID, recorded in the terminal, of the exclusive SE; if the ID of the currently removed SE is the same as the ID, recorded in the terminal, of the exclusive SE, constructing a routing table according to a routing entry corresponding to an SE in a connected state and routing information included in the HCE; and checking whether setting a default routing entry is supported, and if setting a default routing entry is supported, re-designating an SE as the default routing target SE, where the constructed routing table may include or not include a routing entry corresponding to the default routing target SE; and acquiring a configuration success message, setting the SE flag to the first value, and updating the ID, currently recorded in the terminal, of the exclusive SE to be invalid.

With reference to the seventh possible implementation manner of the first aspect, in an eighth possible implementation manner of the first aspect, the method further includes, if the SE flag is not of the second value, deleting a routing entry corresponding to the currently removed SE from the current routing table, determining, when setting a default routing entry is supported, whether the currently removed SE is the default routing target SE, and if the currently removed SE is the default routing target SE, re-designating an SE as the default routing target SE.

With reference to the seventh possible implementation manner of the first aspect, in a ninth possible implementation manner of the first aspect, if an NFCC of the terminal device is capable of deleting a routing entry, after it is determined that the ID of the currently removed SE is the same as the ID, recorded in the terminal, of the exclusive SE, the method further includes checking whether an HCE exists in the terminal device; if no HCE exists in the terminal device, constructing a routing table according to a routing entry corresponding to an SE in a connected state; and checking whether setting a default routing entry is supported, and if setting a default routing entry is supported, re-designating an SE as the default routing target SE, where the constructed routing table may include or not include a routing entry corresponding to the default routing target SE; acquiring a configuration success message, setting the SE flag to the first value, and updating the ID, currently recorded in the terminal, of the exclusive SE to be invalid.

With reference to the ninth possible implementation manner of the first aspect, in a tenth possible implementation manner of the first aspect, if an HCE exists in the terminal device, it is checked whether the current routing table includes a routing entry whose target is the HCE; if the current routing table includes the routing entry whose target is the HCE, a routing table is constructed according to the routing entry corresponding to the SE in a connected state and the routing entry corresponding to the HCE; and it is checked whether setting a default routing entry is supported, and if setting a default routing entry is supported, an SE is re-designated as the default routing target SE, where the constructed routing table may include or not include a routing entry corresponding to the default routing target SE; and a configuration success message is acquired, the SE flag is set to the first value, and the ID, currently recorded in the terminal, of the exclusive SE is updated to be invalid.

With reference to the tenth possible implementation manner of the first aspect, in an eleventh possible implementation manner of the first aspect, if the current routing table does not include the routing entry whose target is the HCE, it is checked whether the current routing table includes any routing entry corresponding to a non-exclusive SE; if the current routing table includes a routing entry corresponding to a non-exclusive SE, the routing entry corresponding to the currently removed exclusive SE is deleted to construct a routing table; and it is checked whether setting a default routing entry is supported, and if setting a default routing entry is supported, an SE is re-designated as the default routing target SE, where the constructed routing table may include or not include a routing entry corresponding to the default routing target SE; and a configuration success message is acquired, the SE flag is set to the first value, and the ID, currently recorded in the terminal, of the exclusive SE is updated to be invalid.

With reference to the eleventh possible implementation manner of the first aspect, in a twelfth possible implementation manner of the first aspect, if the current routing table does not include any routing entry corresponding to a non-exclusive SE, a routing table is constructed according to a routing entry corresponding to an SE in a connected state and the routing information included in the HCE; and it is checked whether setting a default routing entry is supported, and if setting a default routing entry is supported, an SE is re-designated as the default routing target SE, where the constructed routing table may include or not include a routing entry corresponding to the default routing target SE; and a configuration success message is acquired, the SE flag is set to the first value, and the ID, currently recorded in the terminal, of the exclusive SE is updated to be invalid.

According to a second aspect, a terminal device is disclosed, including a detecting unit configured to check whether a newly connected SE is an exclusive SE, where the detecting unit is further configured to, after it is detected that the newly connected SE is an exclusive SE, check whether setting a default routing entry is supported; a constructing unit configured to, after the detecting unit detects that setting a default routing entry is not supported, construct a routing table that includes only a routing entry corresponding to the exclusive SE; and a setting unit configured to, after the detecting unit detects that setting a default routing entry is supported, set the newly connected SE as a default routing target SE, where the constructed routing table may include or not include the routing entry corresponding to the exclusive SE.

With reference to the second aspect, in a first possible implementation manner of the second aspect, the setting unit is further configured to, if the newly connected SE is not an exclusive SE, set an SE flag to a first value, and if the newly connected SE is an exclusive SE, set the SE flag to a second value and record an ID of the newly connected SE, where the first value indicates that currently no exclusive SE is connected to the terminal, and the second value indicates that currently an exclusive SE is connected to the terminal.

With reference to the second aspect, in a second possible implementation manner of the second aspect, the setting unit is further configured to set the SE flag, where an initial value of the SE flag is a first value; and the terminal device further includes a determining unit configured to determine whether the SE flag is of the first value; and an acquiring unit configured to, if the determining unit determines that the SE flag is of the first value, acquire a current routing table.

With reference to the second possible implementation manner of the second aspect, in a third possible implementation manner of the second aspect, the constructing unit is further configured to, after the detecting unit detects that the newly connected SE is not an exclusive SE, add a routing entry corresponding to the newly connected SE to the current routing table to construct a routing table; and the determining unit is further configured to, when the detecting unit detects that setting a default routing entry is supported, determine whether the default routing target SE needs to be re-designated, where the constructed routing table may include or not include a routing entry corresponding to the default routing target SE.

With reference to the second aspect, in a fourth possible implementation manner of the second aspect, if an NFCC of the terminal device is capable of deleting a routing entry, the detecting unit is further configured to check whether an HCE exists in the terminal device; and the constructing unit is further configured to, if the detecting unit detects that no HCE exists in the terminal device, when setting a default routing entry is not supported, add the routing entry corresponding to the newly connected exclusive SE to the current routing table to construct a routing table, where if setting a default routing entry is supported, the constructed routing table may include or not include the routing entry corresponding to the newly connected exclusive SE.

With reference to the fourth possible implementation manner of the second aspect, in a fifth possible implementation manner of the second aspect, the detecting unit is further configured to, if the detecting unit detects that an HCE exists in the terminal device, check whether the routing table includes a routing entry whose target is the HCE; and the constructing unit is further configured to, if the detecting unit detects that the routing table does not include the routing entry whose target is the HCE, when setting a default routing entry is not supported, add the routing entry corresponding to the newly connected exclusive SE to the current routing table to construct a routing table, where if setting a default routing entry is supported, the constructed routing table may include or not include the routing entry corresponding to the newly connected exclusive SE.

With reference to the fifth possible implementation manner of the second aspect, in a sixth possible implementation manner of the second aspect, the constructing unit is further configured to, if the detecting unit detects that the routing table includes the routing entry whose target is the HCE, delete, when the detecting unit detects that setting a default routing entry is not supported, routing entries corresponding to the HCE and a non-exclusive SE from the routing table and write the routing entry corresponding to the newly connected SE to construct a routing table that includes only the routing entry corresponding to the newly connected exclusive SE, where if setting a default routing entry is supported, the constructed routing table may include or not include the routing entry corresponding to the newly connected exclusive SE.

With reference to the second possible implementation manner of the second aspect, in a seventh possible implementation manner of the second aspect, the detecting unit is further configured to check whether an SE is removed; the acquiring unit is further configured to, after the detecting unit detects that an SE is removed, acquire an ID of the currently removed SE; the determining unit is further configured to determine whether the SE flag is of the second value; the determining unit is further configured to, if the SE flag is of the second value, determine whether the ID of the currently removed SE is the same as an ID, recorded in the terminal, of the exclusive SE; the constructing unit is further configured to, if the determining unit determines that the ID of the currently removed SE is the same as the ID, recorded in the terminal, of the exclusive SE, construct a routing table according to a routing entry corresponding to an SE in a connected state and routing information included in an HCE; the detecting unit is further configured to check whether setting a default routing entry is supported; the constructing unit is further configured to, if the detecting unit detects that setting a default routing entry is supported, construct a routing table that includes or does not include a routing entry corresponding to the default routing target SE; the setting unit is further configured to, after the detecting unit detects that setting a default routing entry is supported, re-designate an SE as the default routing target SE; the terminal device further includes the acquiring unit, where the acquiring unit is configured to acquire a configuration success message; and the setting unit is further configured to set the SE flag to the first value and update the ID, currently recorded in the terminal, of the exclusive SE to be invalid.

With reference to the seventh possible implementation manner of the second aspect, in an eighth possible implementation manner of the second aspect, the constructing unit is further configured to, if the determining unit determines that the SE flag is not of the second value, delete a routing entry corresponding to the currently removed SE from the current routing table; the determining unit is further configured to, when setting a default routing entry is supported, determine whether the currently removed SE is the default routing target SE; the determining unit is further configured to, when it is determined that setting a default routing entry is supported, determine whether the currently removed SE is the default routing target SE; and the setting unit is further configured to, after the determining unit determines that the currently removed SE is the default routing target SE, re-designate an SE as the default routing target SE.

With reference to the seventh possible implementation manner of the second aspect, in a ninth possible implementation manner of the second aspect, the detecting unit is further configured to check whether an HCE exists in the terminal device; the constructing unit is further configured to construct a routing table according to a routing entry corresponding to an SE in a connected state; the detecting unit is further configured to check whether setting a default routing entry is supported; the setting unit is further configured to, after it is detected that setting a default routing entry is supported, re-designate an SE as the default routing target SE, where the constructed routing table may include or not include a routing entry corresponding to the default routing target SE; the acquiring unit is further configured to acquire a configuration success message; and the setting unit is further configured to set the SE flag to the first value and update the ID, currently recorded in the terminal, of the exclusive SE to be invalid.

With reference to the ninth possible implementation manner of the second aspect, in a tenth possible implementation manner of the second aspect, the detecting unit is further configured to, if an HCE exists in the terminal device, check whether the current routing table includes a routing entry whose target is the HCE; the constructing unit is further configured to, after the detecting unit detects that the current routing table includes the routing entry whose target is the HCE, construct a routing table according to the routing entry corresponding to the SE in a connected state and the routing entry corresponding to the HCE; the detecting unit is further configured to check whether setting a default routing entry is supported; the setting unit is further configured to, if the detecting unit detects that setting a default routing entry is supported, re-designate an SE as the default routing target SE, where the constructed routing table may include or not include a routing entry corresponding to the default routing target SE; the acquiring unit is further configured to acquire a configuration success message; and the setting unit is further configured to set the SE flag to the first value and update the ID, currently recorded in the terminal, of the exclusive SE to be invalid.

With reference to the tenth possible implementation manner of the second aspect, in an eleventh possible implementation manner of the second aspect, the detecting unit is further configured to, after the detecting unit detects that the current routing table does not include the routing entry whose target is the HCE, check whether the current routing table includes any routing entry corresponding to a non-exclusive SE; the constructing unit is further configured to, after the detecting unit detects that the current routing table includes a routing entry corresponding to a non-exclusive SE, delete the routing entry corresponding to the currently removed exclusive SE to construct a routing table; the detecting unit is further configured to check whether setting a default routing entry is supported; the setting unit is further configured to, if the detecting unit detects that setting a default routing entry is supported, re-designate an SE as the default routing target SE, where the constructed routing table may include or not include a routing entry corresponding to the default routing target SE; the acquiring unit is further configured to acquire a configuration success message; and the setting unit is further configured to set the SE flag to the first value and update the ID, currently recorded in the terminal, of the exclusive SE to be invalid.

With reference to the eleventh possible implementation manner of the second aspect, in a twelfth possible implementation manner of the second aspect, the constructing unit is further configured to, if the current routing table does not include any routing entry corresponding to a non-exclusive SE, construct a routing table according to a routing entry corresponding to an SE in a connected state and the routing information included in the HCE; the detecting unit is further configured to check whether setting a default routing entry is supported; the setting unit is further configured to, if the detecting unit detects that setting a default routing entry is supported, re-designate an SE as the default routing target SE, where the constructed routing table may include or not include a routing entry corresponding to the default routing target SE; the acquiring unit is further configured to acquire a configuration success message; and the setting unit is further configured to set the SE flag to the first value and update the ID, currently recorded in the terminal, of the exclusive SE to be invalid.

According to a third aspect, a terminal device is disclosed, including a device host (DH) configured to check whether a newly connected SE is an exclusive SE, where the DH is further configured to, after it is detected that the newly connected SE is an exclusive SE, check whether setting a default routing entry is supported; the DH is configured to, after it is detected that setting a default routing entry is not supported, construct a routing table that includes only a routing entry corresponding to the exclusive SE; and the DH is configured to, after it is detected that setting a default routing entry is supported, set the newly connected SE as a default routing target SE, where the constructed routing table may include or not include the routing entry corresponding to the exclusive SE.

With reference to the third aspect, in a first possible implementation manner of the third aspect, the DH is further configured to, if the newly connected SE is not an exclusive SE, set an SE flag to a first value, and if the newly connected SE is an exclusive SE, set the SE flag to a second value and record an ID of the newly connected SE, where the first value indicates that currently no exclusive SE is connected to the terminal, and the second value indicates that currently an exclusive SE is connected to the terminal.

With reference to the third aspect, in a second possible implementation manner of the third aspect, the method further includes setting the SE flag, where an initial value of the SE flag is a first value; and the DH is configured to determine whether the SE flag is of the first value; and the DH is configured to, if it is determined that the SE flag is of the first value, acquire a current routing table.

With reference to the second possible implementation manner of the third aspect, in a third possible implementation manner of the third aspect, the DH is further configured to, after it is detected that the newly connected SE is not an exclusive SE, add a routing entry corresponding to the newly connected SE to the current routing table to construct a routing table; and the DH is further configured to, when it is detected that setting a default routing entry is supported, determine whether the default routing target SE needs to be re-designated, where the constructed routing table may include or not include a routing entry corresponding to the default routing target SE.

With reference to the third aspect, in a fourth possible implementation manner of the third aspect, the DH is further configured to check whether an HCE exists in the terminal device; and the DH is further configured to, if it is detected that no HCE exists in the terminal device, when setting a default routing entry is not supported, add the routing entry corresponding to the newly connected exclusive SE to the current routing table to construct a routing table, where if setting a default routing entry is supported, the constructed routing table may include or not include the routing entry corresponding to the newly connected exclusive SE.

With reference to the fourth possible implementation manner of the third aspect, in a fifth possible implementation manner of the third aspect, the DH is further configured to, if it is detected that an HCE exists in the terminal device, check whether a routing table includes the routing entry whose target is the HCE; and the DH is further configured to, if it is detected that the routing table does not include the routing entry whose target is the HCE, when setting a default routing entry is not supported, add the routing entry corresponding to the newly connected exclusive SE to the current routing table to construct a routing table, where if setting a default routing entry is supported, the constructed routing table may include or not include the routing entry corresponding to the newly connected exclusive SE.

With reference to the fifth possible implementation manner of the third aspect, in a sixth possible implementation manner of the third aspect, the DH is further configured to, if it is detected that the routing table includes the routing entry whose target is the HCE, delete, when it is detected that setting a default routing entry is not supported, routing entries corresponding to the HCE and a non-exclusive SE from the routing table and write the routing entry corresponding to the newly connected SE to construct a routing table that includes only the routing entry corresponding to the newly connected exclusive SE, where if setting a default routing entry is supported, the constructed routing table may include or not include the routing entry corresponding to the newly connected exclusive SE.

With reference to the second possible implementation manner of the third aspect, in a seventh possible implementation manner of the third aspect, the DH is further configured to check whether an SE is removed; the DH is further configured to, after it is detected that an SE is removed, acquire an ID of the currently removed SE; the DH is further configured to determine whether the SE flag is of the second value; the DH is further configured to, if the SE flag is of the second value, determine whether the ID of the currently removed SE is the same as an ID, recorded in the terminal, of the exclusive SE; the DH is further configured to, if it is determined that the ID of the currently removed SE is the same as the ID, recorded in the terminal, of the exclusive SE, construct a routing table according to a routing entry corresponding to an SE in a connected state and routing information included in an HCE; the DH is further configured to check whether setting a default routing entry is supported; the DH is further configured to, if it is detected that setting a default routing entry is supported, construct a routing table that includes or does not include a routing entry corresponding to the default routing target SE; the DH is further configured to, after it is detected that setting a default routing entry is supported, re-designate an SE as the default routing target SE; the DH is further configured to acquire a configuration success message; and the DH is further configured to set the SE flag to the first value and update the ID, currently recorded in the terminal, of the exclusive SE to be invalid.

With reference to the seventh possible implementation manner of the third aspect, in an eighth possible implementation manner of the third aspect, the DH is further configured to, if it is determined that the SE flag is not of the second value, delete a routing entry corresponding to the currently removed SE from the current routing table; the DH is further configured to, when setting a default routing entry is supported, determine whether the currently removed SE is the default routing target SE; the DH is further configured to, when it is determined that setting a default routing entry is supported, determine whether the currently removed SE is the default routing target SE; and the DH is further configured to, after it is determined that the currently removed SE is the default routing target SE, re-designate an SE as the default routing target SE.

With reference to the seventh possible implementation manner of the third aspect, in a ninth possible implementation manner of the third aspect, the DH is configured to check whether an HCE exists in the terminal device; the DH is further configured to construct a routing table according to the routing entry corresponding to an SE in a connected state; the DH is further configured to check whether setting a default routing entry is supported; the DH is further configured to, after it is detected that setting a default routing entry is supported, re-designate an SE as the default routing target SE, where the constructed routing table may include or not include a routing entry corresponding to the default routing target SE; the DH is further configured to acquire a configuration success message; and the DH is further configured to set the SE flag to the first value and update the ID, currently recorded in the terminal, of the exclusive SE to be invalid.

With reference to the ninth possible implementation manner of the third aspect, in a tenth possible implementation manner of the third aspect, the DH is configured to, if an HCE exists in the terminal device, check whether the current routing table includes a routing entry whose target is the HCE; the DH is further configured to, after it is detected that the current routing table includes the routing entry whose target is the HCE, construct a routing table according to the routing entry corresponding to the SE in a connected state and the routing entry corresponding to the HCE; the DH is further configured to check whether setting a default routing entry is supported; the DH is further configured to, if it is detected that setting a default routing entry is supported, re-designate an SE as the default routing target SE, where the constructed routing table may include or not include a routing entry corresponding to the default routing target SE; the DH is further configured to acquire a configuration success message; and the DH is further configured to set the SE flag to the first value and update the ID, currently recorded in the terminal, of the exclusive SE to be invalid.

With reference to the tenth possible implementation manner of the third aspect, in an eleventh possible implementation manner of the third aspect, the DH is configured to, after it is detected that the current routing table does not include the routing entry whose target is the HCE, check whether the current routing table includes any routing entry corresponding to a non-exclusive SE; the DH is further configured to, after it is detected that the current routing table includes a routing entry corresponding to a non-exclusive SE, delete the routing entry corresponding to the currently removed exclusive SE to construct a routing table; the DH is further configured to check whether setting a default routing entry is supported; the DH is further configured to, if it is detected that setting a default routing entry is supported, re-designate an SE as the default routing target SE, where the constructed routing table may include or not include a routing entry corresponding to the default routing target SE; the DH is further configured to acquire a configuration success message; and the DH is further configured to set the SE flag to the first value and update the ID, currently recorded in the terminal, of the exclusive SE to be invalid.

With reference to the eleventh possible implementation manner of the third aspect, in a twelfth possible implementation manner of the third aspect, the DH is configured to, if the current routing table does not include any routing entry corresponding to a non-exclusive SE, construct a routing table according to a routing entry corresponding to an SE in a connected state and the routing information included in the HCE; the DH is further configured to check whether setting a default routing entry is supported; the DH is further configured to, if the detecting unit detects that setting a default routing entry is supported, re-designate an SE as the default routing target SE, where the constructed routing table may include or not include a routing entry corresponding to the default routing target SE; the DH is further configured to acquire a configuration success message; and the DH is further configured to set the SE flag to the first value and update the ID, currently recorded in the terminal, of the exclusive SE to be invalid.

According to the route setting method and terminal device provided in the embodiments of the present disclosure, after an exclusive SE is connected to a terminal, running of all non-exclusive SEs including an HCE can be terminated by setting a routing table. Compared with the prior art in which running of an HCE cannot be terminated using an instruction, the method and terminal device provided in the present disclosure can avoid use of an HCE, thereby ensuring normal running of a newly connected exclusive SE.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

An SE can provide a secure and reliable environment for mobile payment of a terminal. Therefore, as long as the terminal takes control of an SE, the terminal controls an entry to installing a mobile payment application in the terminal. An operator expects a terminal manufacturer to provide a technical solution, such that after a UICC card that is released by the operator and includes an SE is installed in the terminal, only the SE in the UICC card is allowed to work normally, and all SEs that are in another medium and controlled by a non-mobile operator are shielded. The SE in the UICC card may be referred to as an exclusive SE and the SE that is in another medium and controlled by a non-mobile operator is referred to as a non-exclusive SE. In this way, after the UICC card is installed in the terminal, the terminal needs to terminate running of the non-exclusive SE to ensure normal running of the exclusive SE. In addition, the current terminal may implement an HCE by means of software simulation. For the UICC card currently installed in the terminal, the HCE is non-exclusive, and the terminal needs to terminate running of the HCE after the SE in the UICC card is connected. In addition, in some NFC routing mechanisms, setting a default route is further supported, and meanwhile only one SE/HCE can be configured as a default routing target SE in the system. A technical idea is that all processed routing requests for which a matched processing entry cannot be found are delivered to this default routing target SE/HCE for processing. Therefore, when constructing a routing table, the terminal may include or not include, in the routing table, a routing entry corresponding to the default routing target SE/HCE.

Embodiment 1

Figure 1:
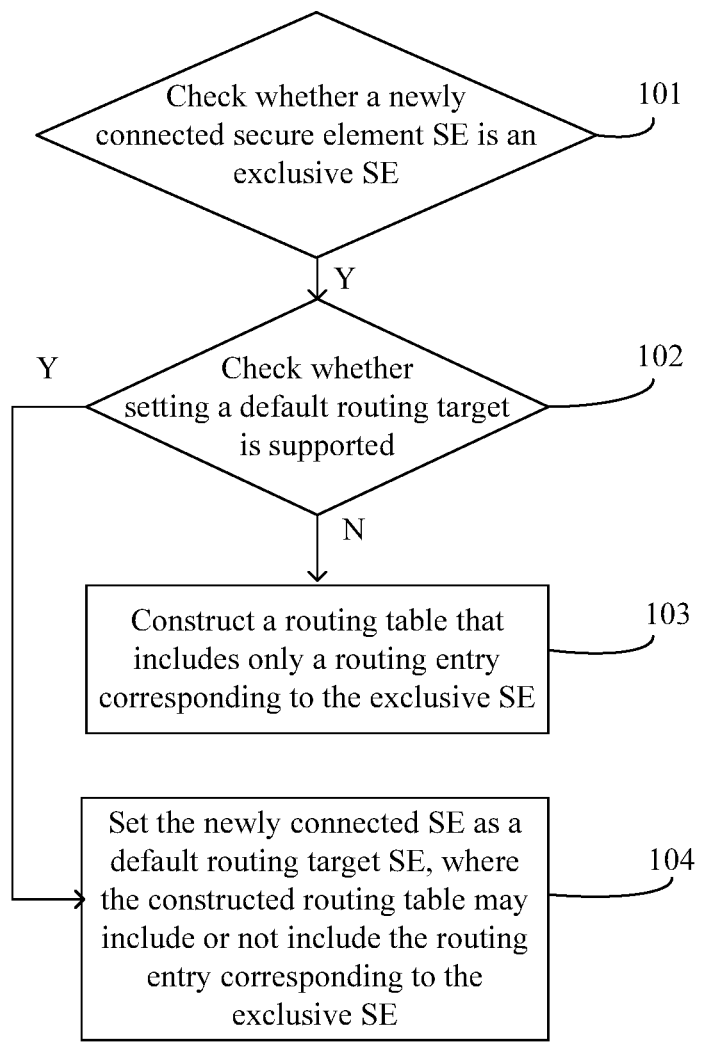
FIG. 1 is a schematic flowchart of a route setting method according to Embodiment 1 of the present disclosure.

An embodiment of the present disclosure provides a route setting method. As shown in FIG. 1, the method includes the following steps.

101. Check whether a newly connected SE is an exclusive SE.

From a macroscopic perspective, a terminal includes a DH, an NFCC, and a CPU, where the NFCC may have a capability of deleting a routing entry, or may be incapable of deleting a routing entry. When an SE is newly connected to the terminal, the DH needs to determine whether the newly connected SE is an exclusive SE or a non-exclusive SE, and if the newly connected SE is an exclusive SE, step 102 needs to be performed.

In addition, if an SE flag is set for the DH of the terminal device, where an initial value of the SE flag is a first value, before the checking whether a newly connected SE is an exclusive SE, it may also be determined whether the SE flag is of the first value, and if the SE flag is of the first value, a current routing table is acquired. The first value indicates that currently no exclusive SE is connected to the terminal. If the DH of the terminal device detects that the SE flag is of a second value, configuration processing does not need to be performed and the current routing table is not changed. The second value indicates that currently an exclusive SE is connected to the terminal. This is because, according to a business requirement of an operator, the terminal device is generally allowed to guarantee normal running of only one exclusive SE. That is, in a case in which an exclusive SE is already connected to the terminal device, configuration processing is not performed regardless whether the newly connected SE is an exclusive SE.

If detecting that the newly connected SE is not an exclusive SE, the DH of the terminal device sets the SE flag to the first value; and if the newly connected SE is an exclusive SE, the DH of the terminal device sets the SE flag to the second value and records an ID of the newly connected SE. The recorded ID of the newly connected SE herein is used as an ID of the exclusive SE currently connected to the terminal, in order to determine, when an SE is removed, whether an exclusive SE is currently connected to the terminal, such that corresponding configuration processing is performed to save system overhead.

If detecting that the newly connected SE is not an exclusive SE, the DH of the terminal device adds a routing entry corresponding to the newly connected SE to the current routing table to construct a routing table, and determines, when setting a default routing entry is supported, whether a default routing target SE needs to be re-designated, where the constructed routing table may include or not include a routing entry corresponding to the default routing target SE.

In the DH and NFCC of the terminal device, the DH is always capable of deleting a specific routing entry by means of constructing a new routing table, and the NFCC possibly has or does not have a capability of deleting a routing table. Therefore, a case in which the NFCC is capable of deleting a routing table or is incapable of deleting a routing table needs to be differentiated.

If the NFCC of the terminal is capable of deleting a routing table, after checking whether the newly connected SE is an exclusive SE, the DH of the terminal device further needs to check whether an HCE exists in the terminal device. If no HCE exists in the terminal device, when setting a default routing entry is not supported, the routing entry corresponding to the newly connected exclusive SE is added to the current routing table to construct a routing table, where if setting a default routing entry is supported, the constructed routing table may include or not include the routing entry corresponding to the newly connected exclusive SE. Herein, after it is detected that an HCE exists in the terminal, it is also required to check whether the routing table includes a routing entry corresponding to the HCE because if an HCE exists in the terminal but the routing table does not have the routing entry corresponding to the HCE, the HCE cannot be run. In this way, after an exclusive SE is connected to the terminal, an SE setting instruction is used to deactivate a non-exclusive SE and activate the exclusive SE, thereby ensuring normal running of the exclusive SE.

If an HCE exists in the terminal device, it is checked whether the routing table includes a routing entry whose target is the HCE; and if the routing table does not include the routing entry whose target is the HCE, when setting a default routing entry is not supported, the routing entry corresponding to the newly connected exclusive SE is added to the current routing table to construct a routing table, where if setting a default routing entry is supported, the constructed routing table may include or not include the routing entry corresponding to the newly connected exclusive SE.

If the routing table includes the routing entry whose target is the HCE, when it is detected that setting a default routing entry is not supported, a routing entry corresponding to the HCE and that corresponding to a non-exclusive SE are deleted from the routing table and the routing entry corresponding to the newly connected SE is written to construct a routing table that includes only the routing entry corresponding to the newly connected exclusive SE, where if setting a default routing entry is supported, the constructed routing table may include or not include the routing entry corresponding to the newly connected exclusive SE.

102. Check whether setting a default routing entry is supported.

Whether the terminal supports setting a default route determines that, when the terminal constructs a routing table, the routing table may include or not include a routing entry corresponding to a default routing target SE/HCE. Therefore, it is required to check whether the terminal has a capability of setting a default routing entry.

103. Construct a routing table that includes only a routing entry corresponding to the exclusive SE.

Herein, the DH of the terminal device constructs, according to the newly connected exclusive SE, the routing table that includes only the routing entry corresponding to the exclusive SE. It should be noted that the routing table herein and the foregoing routing table that is constructed by adding the routing entry corresponding to the newly connected exclusive SE to the current routing table are two different route settings. Detailed differentiation is described in the following embodiments.

Herein, because the terminal does not support setting a default routing entry, a routing request for which a matched processing entry cannot be found cannot be resolved by means of processing by the default routing entry target SE. Therefore, in this case, the constructed routing table cannot include a routing entry corresponding to a non-exclusive SE and includes only the routing entry corresponding to the exclusive SE.

Herein, the word "construct" shall not be construed as including only establishment, but may also include modification.

104. Set the newly connected SE as a default routing target SE, where the constructed routing table may include or not include the routing entry corresponding to the exclusive SE.

In addition, because the NFC routing mechanism also supports setting of another default route, all processed routing requests for which a matched processing entry cannot be found are delivered to this default routing target SE/HCE for processing. Herein, the newly connected exclusive SE may be set as the default routing entry target SE, and a request of the newly connected SE may be processed using the default route. Therefore, when constructing the routing table, the terminal may include or not include, in the routing table, the routing entry corresponding to the default routing target SE/HCE. Actually, after step 104, the routing table may be empty, because the newly connected exclusive SE is processed as the default route and the routing table may not include any routing entry.

The present disclosure further provides a route setting method, such that when an SE is removed, a route can also be correctly configured according to whether an exclusive SE currently exists in a terminal.

A1. Detect that an SE is removed, and acquire an ID of the currently removed SE.

More specifically, a DH (or NFCC) of the terminal device detects that an SE is removed. Then the DH of the terminal device acquires the ID of the currently removed SE by receiving an instruction sent by the NFCC of the terminal device. In implementation, the DH acquires, from an NFCEE_DISCOVER_NTF (near field communication discover message) sent by the NFCC, an ID corresponding to an SE whose NFCEE Status (near field communication status value) value is 0x02 (that is, an NFCEE ID of the currently removed SE).

A2. Determine whether an SE flag is of a second value.

The DH of the terminal device determines whether the current SE flag is of the second value, because whether an exclusive SE is connected to the terminal affects route configuration when an SE is removed. Such differentiation can ensure correct configuration of a routing table, and the DH of the terminal device does not need to reconfigure a routing table each time when an SE is removed, which saves system overhead greatly.

When an exclusive SE is newly connected, a current routing table needs to be emptied and only a routing entry of the exclusive SE is written. Therefore, when the exclusive SE is removed, a routing entry of a non-exclusive SE whose running is previously terminated needs to be rewritten into the routing table. When a non-exclusive SE is newly connected, the routing table does not need to be emptied and a routing entry of the non-exclusive SE is directly written, and when the non-exclusive SE is removed, it is only required to delete the routing entry of the non-exclusive SE. Because terminal cannot differentiate whether an exclusive SE is currently connected, it cannot be determined whether the current routing table includes only the routing entry of the exclusive SE or includes routing entries of all non-exclusive SEs. Therefore, each time when an SE is removed, the terminal empties the routing table and rewrites the routing entries of all non-exclusive SEs, resulting in high terminal system overhead.

A3. If the SE flag is of the second value, determine whether the ID of the currently removed SE is the same as an ID, recorded in the terminal, of the exclusive SE.

If the SE flag is not of the second value, a routing entry corresponding to the currently removed SE is deleted from the current routing table, and when setting a default routing entry is supported, it is determined whether the currently removed SE is a default routing target SE, and if the currently removed SE is the default routing target SE, an SE is re-designated as the default routing target SE.

A4. If the ID of the currently removed SE is the same as the ID, recorded in the terminal, of the exclusive SE, construct a routing table according to a routing entry corresponding to an SE in a connected state and routing information included in the HCE; check whether setting a default routing entry is supported; and if setting a default routing entry is supported, re-designate an SE as a default routing target SE, where the constructed routing table may include or not include a routing entry corresponding to the default routing target SE.

A5. Acquire a configuration success message, set the SE flag to the first value, and update the ID, currently recorded in the terminal, of the exclusive SE to be invalid.

Because the NFCC may have or not have a capability of deleting a routing table, a case in which the NFCC is capable of deleting a routing table or is incapable of deleting a routing table needs to be differentiated, such that the terminal device correctly constructs a routing table. For example, if the NFCC has the capability of deleting a routing table, the terminal needs to check whether an HCE exists, and after the SE is removed, in a case in which an HCE exists, a routing entry whose target is the HCE needs to be rewritten.

More specifically, if the NFCC of the terminal device is capable of deleting a routing entry, after it is determined that the ID of the currently removed SE is the same as the ID, recorded in the terminal, of the exclusive SE, it is also required to check whether an HCE exists in the terminal device.

If no HCE exists in the terminal device, a routing table is constructed according to a routing entry corresponding to an SE in a connected state; and it is checked whether setting a default routing entry is supported, and if setting a default routing entry is supported, an SE is re-designated as the default routing target SE, where the constructed routing table may include or not include a routing entry corresponding to the default routing target SE. Then a configuration success message is acquired, the SE flag is set to the first value, and the ID, currently recorded in the terminal, of the exclusive SE is updated to be invalid. In addition, an SE mode setting instruction is generated and the SE is activated or deactivated according to the SE mode setting instruction.

According to another aspect, if an HCE exists in the terminal device, it is checked whether the current routing table includes a routing entry whose target is the HCE; if the current routing table includes the routing entry whose target is the HCE, a routing table is constructed according to a routing entry corresponding to an SE in a connected state; and it is checked whether setting a default routing entry is supported, and if setting a default routing entry is supported, an SE is re-designated as the default routing target SE, where the constructed routing table may include or not include a routing entry corresponding to the default routing target SE. A configuration success message is acquired, the SE flag is set to the first value, and the ID, currently recorded in the terminal, of the exclusive SE is updated to be invalid.

If the current routing table does not include the routing entry whose target is the HCE, it is checked whether the current routing table includes any routing entry corresponding to a non-exclusive SE; if the current routing table includes a routing entry corresponding to a non-exclusive SE, a routing table is constructed according to a routing entry corresponding to an SE in a connected state; it is checked whether setting a default routing entry is supported, and if setting a default routing entry is supported, an SE is re-designated as the default routing target SE, where the constructed routing table may include or not include a routing entry corresponding to the default routing target SE; and a configuration success message is acquired, the SE flag is set to the first value, and the ID, currently recorded in the terminal, of the exclusive SE is updated to be invalid.

If the current routing table does not include any routing entry corresponding to a non-exclusive SE, a routing table is constructed according to a routing entry corresponding to an SE in a connected state and the routing information included in the HCE; it is checked whether setting a default routing entry is supported, and if setting a default routing entry is supported, an SE is re-designated as the default routing target SE, where the constructed routing table may include or not include a routing entry corresponding to the default routing target SE; and a configuration success message is acquired, the SE flag is set to the first value, and the ID, currently recorded in the terminal, of the exclusive SE is updated to be invalid.

According to the route setting method and terminal device provided in this embodiment of the present disclosure, after an exclusive SE is connected to a terminal, running of all non-exclusive SEs including an HCE can be terminated by setting a routing table. Compared with the prior art in which running of an HCE cannot be terminated using an instruction, the method and terminal device provided in the present disclosure can avoid use of an HCE, thereby ensuring normal running of a newly connected exclusive SE.

Embodiment 2

Figure 2:
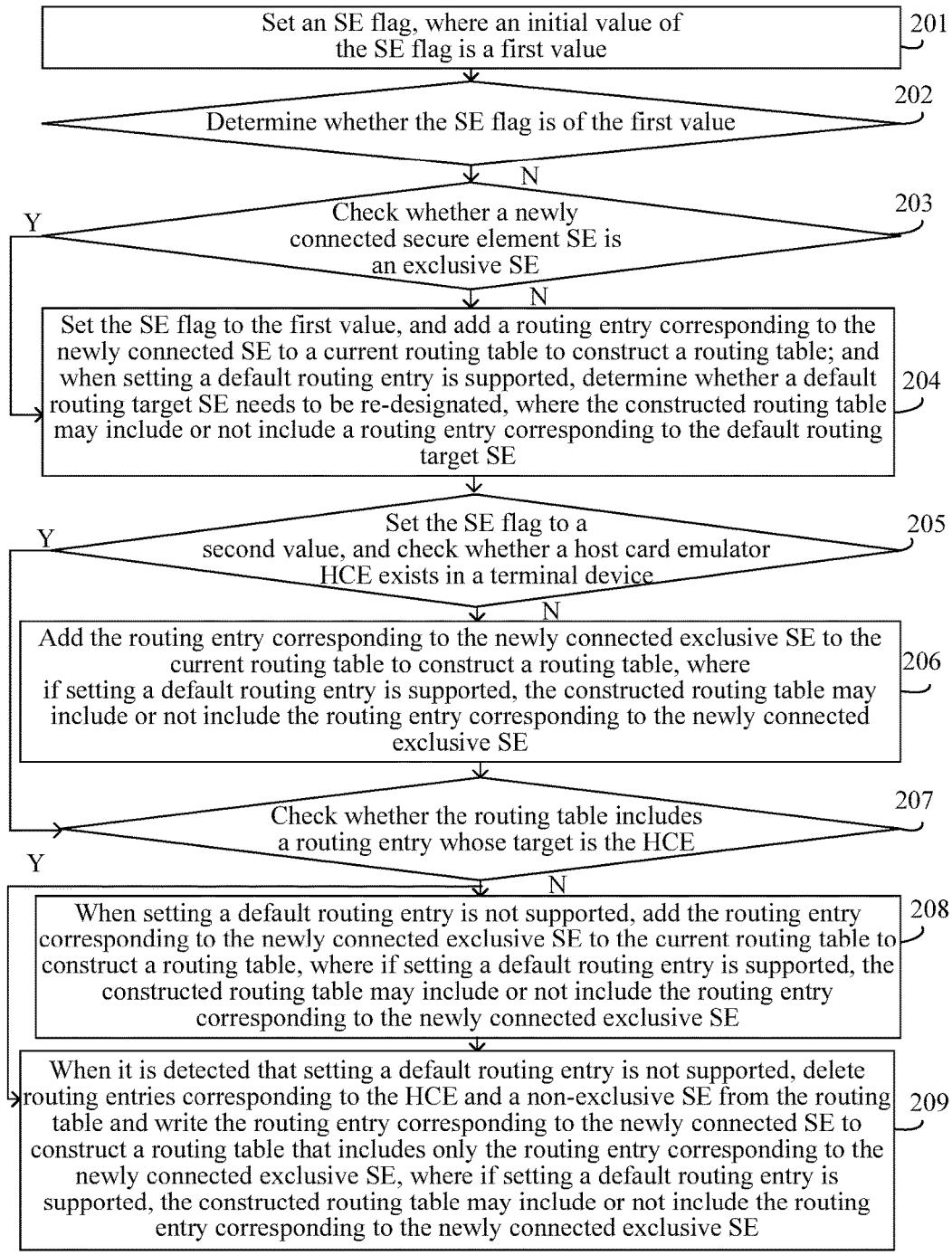
FIG. 2 is a schematic flowchart of a route setting method according to Embodiment 2 of the present disclosure.

An embodiment of the present disclosure provides a route setting method, applied to a terminal device whose NFCC has a capability of deleting a routing table. As shown in FIG. 2, the method includes the following steps.

201. Set the SE flag, where an initial value of the SE flag is a first value.

From a macroscopic perspective, a terminal includes a DH and an NFCC, where the NFCC may have a capability of deleting a routing entry, or may not have the capability of deleting a routing entry.

The DH of the terminal device sets the SE flag. Initially, an exclusive SE is not connected to the terminal, and the first value is used to indicate this state. A value of the SE flag may be the first value or a second value, where the first value indicates that currently no exclusive SE is connected to the terminal, and the first value indicates that currently an exclusive SE is connected to the terminal. More specifically, a flag is added to the DH, where an initial value is 0, where 0 indicates false (that currently no exclusive SE is connected to the terminal), and 1 indicates true (that currently an exclusive SE is connected to the terminal).

202. Determine whether the SE flag is of the first value.

When the SE flag is of the first value, a current routing table is acquired, and when the SE flag is of the second value, configuration processing does not need to be performed.

The DH of the terminal device determines whether the current SE flag is of the second value, because whether an exclusive SE is connected to the terminal affects route configuration when an SE is removed. Such differentiation can ensure correct configuration of a routing table, and the DH of the terminal device does not need to reconfigure a routing table each time when an SE is removed, which saves system overhead greatly. When an exclusive SE is newly connected, the current routing table needs to be emptied and only a routing entry of the exclusive SE is written. Therefore, when the exclusive SE is removed, a routing entry of a non-exclusive SE whose running is previously terminated needs to be rewritten into the routing table. When a non-exclusive SE is newly connected, the routing table does not need to be emptied and a routing entry of the non-exclusive SE is directly written, and when the non-exclusive SE is removed, it is only required to delete the routing entry of the non-exclusive SE. Because the terminal cannot differentiate whether an exclusive SE is currently connected, it cannot be determined whether the current routing table includes only the routing entry of the exclusive SE or includes routing entries of all non-exclusive SEs. Therefore, each time when an SE is removed, the terminal empties the routing table and rewrites the routing entries of all non-exclusive SEs, resulting in high terminal system overhead.

More specifically, after determining that an SE state flag is of the first value, the DH sends an RF_GET_LISTEN_MODE_ROUTING_CMD to the NFCC and acquires a current routing table RT01, or the DH itself backs up a routing table RT01 that is most recently configured for the NFCC.

203. Check whether a newly connected SE is an exclusive SE.

If the connected SE is not an exclusive SE, step 204 is performed; and if the newly connected SE is an exclusive SE, step 205 is performed.

In implementation, the DH of the terminal device determines whether the newly connected SE is an exclusive SE.

204. Set the SE flag to the first value, and add a routing entry corresponding to the newly connected SE to the current routing table to construct a routing table; and when setting a default routing entry is supported, determine whether a default routing target SE needs to be re-designated, where the constructed routing table may include or not include a routing entry corresponding to the default routing target SE.

The DH of the terminal device sets the SE flag to the first value, and on a basis of content of the acquired routing table RT01, a valid routing entry corresponding to the newly connected SE is added to form a new routing table RT02. If the NFCC of the terminal device supports setting a default routing entry, it is determined whether a new default routing target needs to be re-designated. In addition, the RT02 may include or not include a routing entry corresponding to the default routing target (the terminal device supports setting a default route).

The DH sends an RF_SET_LISTEN_MODE_ROUTING_CMD to the NFCC and configures the routing table RT02 for the NFCC; and if the NFCC supports setting a default routing target and has updated the default routing target, a new default routing target is designated at the same time. The DH sends an NFCEE_MODE_SET_CMD to the NFCC to deactivate all non-exclusive SEs currently in an activated state except an HCE, and activate the exclusive SE at the same time. It should be noted that there is no specific order for the foregoing operations of configuring a routing table by the DH and deactivating/activating an SE by the DH, and that no limitation is imposed by this embodiment of the present disclosure.

205. Set the SE flag to a second value, and check whether an HCE exists in the terminal device.

If no HCE exists in the terminal device, step 206 is performed; and if an HCE exists in the terminal device, step 207 is performed.

In implementation, the DH of the terminal device checks whether an HCE exists in a system.

206. Add a routing entry corresponding to the newly connected exclusive SE to the current routing table to construct a routing table, where if setting a default routing entry is supported, the constructed routing table may include or not include the routing entry corresponding to the newly connected exclusive SE.

If the NFCC does not support setting a default route, on a basis of the content of the routing table RT01, the routing entry corresponding to the exclusive SE is added to construct a new routing table RT03. If the NFCC supports setting a default routing target, the RT03 may include or not include the routing entry corresponding to the exclusive SE.

Then, interaction between the DH and the NFCC includes the following: (1) The DH sends an RF_SET_LISTEN_MODE_ROUTING_CMD to the NFCC, and configures the foregoing routing table for the NFCC; and if the NFCC supports setting a default routing target, the exclusive SE is set as the default routing target at the same time. (2) When the DH receives a configuration success message (RSP), the DH sets the Flag value to 1, and records an NFCEE ID, that is, PT_SE_ID of the exclusive SE. The DH sends an NFCEE_MODE_SET_CMD to the NFCC to deactivate all current non-exclusive SEs currently in the activated state except the HCE, and activate the exclusive SE at the same time.

It should be noted that there is no specific order for steps (1) and (2), and that no limitation is imposed by this embodiment of the present disclosure.

207. Check whether the routing table includes a routing entry whose target is the HCE.

If the routing table does not include the routing entry whose target is the HCE, step 208 is performed, and if the routing table does not include the routing entry whose target is the HCE, step 209 is performed.

In implementation, the DH of the terminal device checks whether there exists a writable routing table and routing information with a routing target as the HCE in the system.

208. When setting a default routing entry is not supported, add the routing entry corresponding to the newly connected exclusive SE to the current routing table to construct a routing table, where if setting a default routing entry is supported, the constructed routing table may include or not include the routing entry corresponding to the newly connected exclusive SE.

If the NFCC does not support setting a default route, on a basis of the content of the routing table RT01, the routing entry corresponding to the exclusive SE is added to construct a new routing table RT03. If the NFCC supports setting a default routing target, the RT03 may include or not include the routing entry corresponding to the exclusive SE.

Then, interaction between the DH and the NFCC includes the following: (1) The DH sends an RF_SET_LISTEN_MODE_ROUTING_CMD to the NFCC, and configures the foregoing routing table for the NFCC; and if the NFCC supports setting a default routing target, the exclusive SE is set as the default routing target at the same time. (2) When the DH receives an RSP, the DH sets the Flag value to 1, and records an NFCEE ID, that is, PT_SE_ID of the exclusive SE. The DH sends an NFCEE_MODE_SET_CMD to the NFCC to deactivate all non-exclusive SEs currently in the activated state except the HCE, and activate the exclusive SE at the same time.

It should be noted that there is no specific order for steps (1) and (2), and that no limitation is imposed by this embodiment of the present disclosure.

209. When it is detected that setting a default routing entry is not supported, delete routing entries corresponding to the HCE and a non-exclusive SE from the routing table and write the routing entry corresponding to the newly connected SE to construct a routing table that includes only the routing entry corresponding to the newly connected exclusive SE, where if setting a default routing entry is supported, the constructed routing table may include or not include the routing entry corresponding to the newly connected exclusive SE.

In implementation, if the NFCC does not support setting a default route, the NFCC deletes routing entries corresponding to the HCE and a non-exclusive SE from the routing table and writes the routing entry corresponding to the newly connected SE to construct an RT04 that includes only the routing entry corresponding to the exclusive SE; and if the NFCC supports setting a default routing target, the RT03 may include or not include the routing entry corresponding to the exclusive SE.

The DH sends an RF_SET_LISTEN_MODE_ROUTING_CMD to the NFCC and configures the foregoing routing table for the NFCC; and if the NFCC supports setting a default routing target, the exclusive SE is set as the default routing target at the same time. Further, after receiving an RSP, the DH sets the Flag (that is, the SE flag in this embodiment of the present disclosure) to 1 and records the ID, that is, PT_SE_ID of the exclusive SE. The DH sends an NFCEE_MODE_SET_CMD to the NFCC to deactivate all non-exclusive SEs currently in the activated state except the HCE, and activate the exclusive SE at the same time. It should be noted that there is no specific order for these two steps, and that no limitation is imposed by this embodiment of the present disclosure.

According to the route setting method and terminal device provided in this embodiment of the present disclosure, after an exclusive SE is connected to a terminal, running of all non-exclusive SEs including an HCE can be terminated by setting a routing table. Compared with the prior art in which running of an HCE cannot be terminated using an instruction, the method and terminal device provided in the present disclosure can avoid use of an HCE, thereby ensuring normal running of a newly connected exclusive SE.

Embodiment 3

Figure 3:
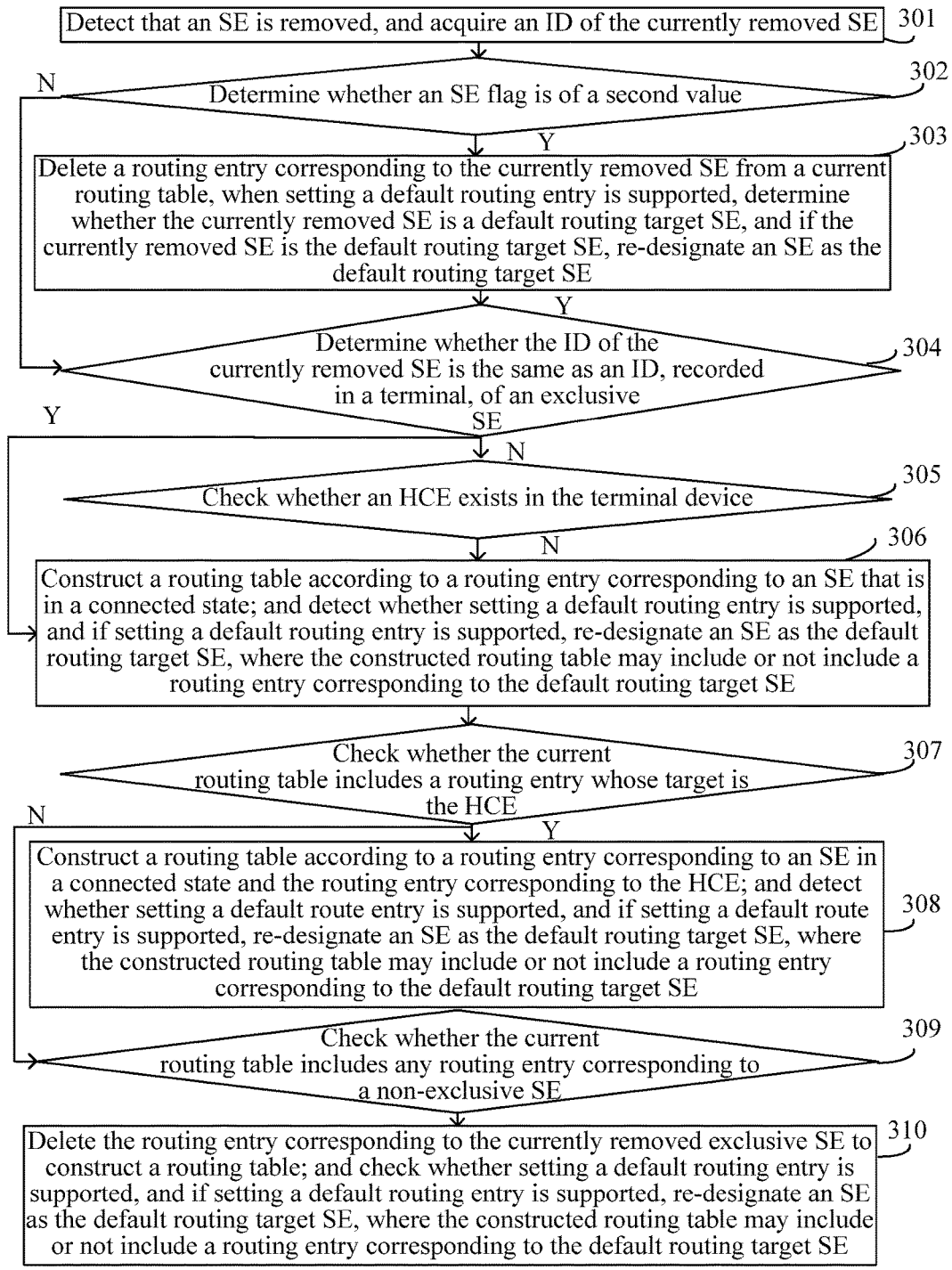
FIG. 3 is a schematic flowchart of a route setting method according to Embodiment 3 of the present disclosure.

An embodiment of the present disclosure provides a route setting method, applied to a terminal device whose NFCC has a capability of deleting a routing table. As shown in FIG. 3, the method includes the following steps.

301. Detect that an SE is removed, and acquire an ID of the currently removed SE.

It should be noted that a DH or NFCC of the terminal device is capable of checking whether an SE is removed. In implementation, the DH acquires, from an NFCEE_DISCOVER_NTF sent by the NFCC, an NFCEE ID corresponding to an SE whose NFCEE Status value is 0x02 (that is, an NFCEE ID of the currently removed SE).

302. Determine whether an SE flag is of a second value.

If the SE flag is of the second value, step 303 is performed; and if the SE flag is not of the second value, step 304 is performed.

303. Delete a routing entry corresponding to the currently removed SE from a current routing table, determine, when setting a default routing entry is supported, whether the currently removed SE is a default routing target SE, and if the currently removed SE is the default routing target SE, re-designate an SE as the default routing target SE.

More specifically, the NFCC deletes the routing entry corresponding to this SE. If the NFCC supports setting a default routing entry, the DH determines whether this removed SE is a current default routing entry target SE, and if this removed SE is the current default routing entry target SE, an SE is re-designated as the default routing entry target SE and the default routing target SE is configured for the NFCC.

304. Determine whether the ID of the currently removed SE is the same as an ID, recorded in the terminal, of an exclusive SE.

If the ID of the currently removed SE is different from the ID, recorded in the terminal, of an exclusive SE, configuration processing does not need to be performed, and if the ID of the currently removed SE is the same as the ID, recorded in the terminal, of an exclusive SE, step 305 is performed.

In implementation, the DH determines whether the NFCEE ID of the removed SE is equal to PT_SE_ID (the ID, currently recorded in the terminal, of an exclusive SE). In a general case, the terminal can guarantee running of only one exclusive SE, and therefore it may be determined whether the currently removed SE is an exclusive SE by determining whether the NFCEE ID of the removed SE is equal to PT_SE_ID. If the NFCEE ID of the removed SE is the same as PT_SE_ID, it is proved that the currently removed SE is an exclusive SE.

305. Check whether an HCE exists in the terminal device.

If no HCE exists in the terminal device, step 306 is performed; and if an HCE exists in the terminal device, step 307 is performed.

The DH of the terminal device checks system service registration and determines whether an HCE exists.

306. Construct a routing table according to a routing entry corresponding to an SE in a connected state; and check whether setting a default routing entry is supported, and if setting a default routing entry is supported, re-designate an SE as the default routing target SE, where the constructed routing table may include or not include a routing entry corresponding to the default routing target SE.

More specifically, if the NFCC supports setting a default routing target, the DH also selects and sets a new default routing target. The NFCC deletes the routing entry corresponding to the exclusive SE. The DH sends an NFCEE_MODE_SET_CMD instruction to the NFCC to activate some/all non-exclusive SEs according to a requirement. After receiving an RSP that feeds back a configuration success, the DH sets a Flag value to 0 and sets PT_SE_ID to N/A (that is, in this embodiment of the present disclosure, the SE flag is set to the first value and the ID, currently recorded in the terminal, of an exclusive SE is updated to be invalid).

307. Check whether the current routing table includes a routing entry whose target is the HCE.

If the current routing table includes the routing entry whose target is the HCE, step 308 is performed; and if the current routing table does not include the routing entry whose target is the HCE, step 309 is performed.

308. Construct a routing table according to a routing entry corresponding to an SE in a connected state and the routing entry corresponding to the HCE; and check whether setting a default routing entry is supported, and if setting a default routing entry is supported, re-designate an SE as the default routing target SE, where the constructed routing table may include or not include a routing entry corresponding to the default routing target SE.

Then a configuration success message is acquired, the SE flag is set to the first value, and the ID, currently recorded in the terminal, of an exclusive SE is updated to be invalid.

More specifically, the DH constructs a routing table RT05 according to routing information included in the connected SE and the HCE. If the NFCC supports a default route, an SE is reselected as the default routing target SE, and the RT05 may include/not include a route of the default routing target SE.

The DH sends an RF_SET_LISTEN_MODE_ROUTING_CMD to the NFCC and configures the foregoing routing table for the NFCC. If the NFCC supports setting a default routing target, a new default routing target is set at the same time. The DH sends an NFCEE_MODE_SET_CMD to the NFCC to activate a part of/all non-exclusive SEs according to a requirement. After receiving an RSP that feeds back a configuration success, the DH sets the Flag value to 0 and sets PT_SE_ID to N/A (that is, in this embodiment of the present disclosure, the ID, currently recorded in the terminal, of an exclusive SE is updated to be invalid).

309. Check whether the current routing table includes any routing entry corresponding to a non-exclusive SE.

If the current routing table includes a routing entry corresponding to a non-exclusive SE, step 310 is performed; and if the current routing table does not include any routing entry corresponding to a non-exclusive SE, step 308 is performed.

310. Delete the routing entry corresponding to the currently removed exclusive SE to construct a routing table; and check whether setting a default routing entry is supported, and if setting a default routing entry is supported, re-designate an SE as the default routing target SE, where the constructed routing table may include or not include a routing entry corresponding to the default routing target SE.

A configuration success message is acquired, the SE flag is set to the first value, and the ID, currently recorded in the terminal, of an exclusive SE is updated to be invalid.

If the NFCC supports setting a default routing target, the DH selects and sets a new default routing target at the same time. The NFCC deletes the routing entry corresponding to the exclusive SE. The DH sends an NFCEE_MODE_SET_CMD instruction to the NFCC to activate a part of/all non-exclusive SEs according to a requirement. After receiving an RSP that feeds back a configuration success, the DH sets the Flag value to 0 and sets PT_SE_ID to N/A.

According to the route setting method provided in this embodiment of the present disclosure, after an exclusive SE is connected to a terminal, running of all non-exclusive SEs including an HCE can be terminated by setting a routing table. Compared with the prior art in which running of an HCE cannot be terminated using an instruction, the method and terminal device provided in the present disclosure can avoid use of an HCE, thereby ensuring normal running of a newly connected exclusive SE.

Embodiment 4

Figure 4:
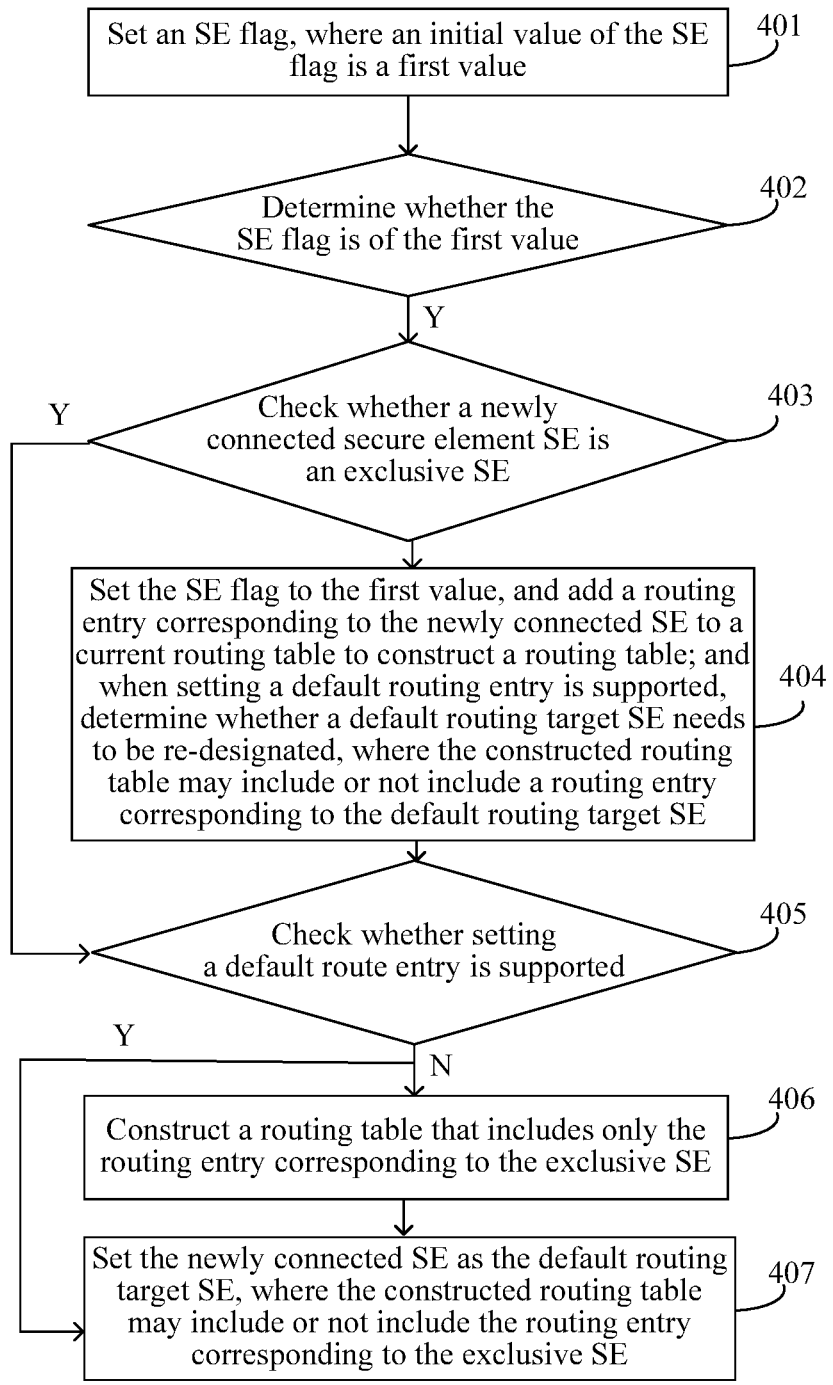
FIG. 4 is a schematic flowchart of a route setting method according to Embodiment 4 of the present disclosure.

An embodiment of the present disclosure provides a route setting method, applied to a terminal device whose NFCC does not have a capability of deleting a routing table. As shown in FIG. 4, the method includes the following steps.

401. Set the SE flag, where an initial value of the SE flag is a first value.

From a macroscopic perspective, a terminal includes a DH and an NFCC, where the NFCC may have a capability of deleting a routing entry, or may not have the capability of deleting a routing entry. In this embodiment, it is specified that the NFCC does not have the capability of deleting a routing entry.

The DH of the terminal device sets the SE flag. Initially, an exclusive SE is not connected to the terminal, and the first value is used to indicate this state. A value of the SE flag may be the first value or a second value, where the first value indicates that currently no exclusive SE is connected to the terminal, and the first value indicates that currently an exclusive SE is connected to the terminal. More specifically, a flag is added to the DH, where an initial value is 0, where 0 indicates false (that currently no exclusive SE is connected to the terminal), and 1 indicates true (that currently an exclusive SE is connected to the terminal).

402. Determine whether the SE flag is of the first value.

When the SE flag is of the first value, a current routing table is acquired.

The DH of the terminal device determines whether the current SE flag is of the second value, because whether an exclusive SE is connected to the terminal affects route configuration when an SE is removed. Such differentiation can ensure correct configuration of a routing table, and the DH of the terminal device does not need to reconfigure a routing table each time when an SE is removed, which saves system overhead greatly. When an exclusive SE is newly connected, the current routing table needs to be emptied and only a routing entry of the exclusive SE is written. Therefore, when the exclusive SE is removed, a routing entry of a non-exclusive SE whose running is previously terminated needs to be rewritten into the routing table. When a non-exclusive SE is newly connected, the routing table does not need to be emptied and a routing entry of the non-exclusive SE is directly written, and when the non-exclusive SE is removed, it is only required to delete the routing entry of the non-exclusive SE. Because the terminal cannot differentiate whether an exclusive SE is currently connected, it cannot be determined whether the current routing table includes only the routing entry of the exclusive SE or includes routing entries of all non-exclusive SEs. Therefore, each time when an SE is removed, the terminal empties the routing table and rewrites the routing entries of all non-exclusive SEs, resulting in high terminal system overhead.

More specifically, after determining that an SE state flag is of the first value, the DH sends an RF_GET_LISTEN_MODE_ROUTING_CMD to the NFCC and acquires a current routing table RT01, or the DH itself backs up a routing table RT01 that is most recently configured for the NFCC.

403. Check whether a newly connected SE is an exclusive SE.

If the connected SE is not an exclusive SE, step 404 is performed; and if the newly connected SE is an exclusive SE, step 405 is performed.

In implementation, the DH of the terminal device determines whether the newly connected SE is an exclusive SE.

404. Set the SE flag to the first value, and add a routing entry corresponding to the newly connected SE to the current routing table to construct a routing table; and when setting a default routing entry is supported, determine whether a default routing target SE needs to be re-designated, where the constructed routing table may include or not include a routing entry corresponding to the default routing target SE.

The DH of the terminal device sets the SE flag to the first value, and on a basis of content of the acquired routing table RT01, a valid routing entry corresponding to the newly connected SE is added to form a new routing table RT02. If the NFCC of the terminal device supports setting a default routing entry, it is determined whether a new default routing target needs to be re-designated. In addition, the RT02 may include or not include a routing entry corresponding to the default routing target (the terminal device supports setting a default route).

The DH sends an RF_SET_LISTEN_MODE_ROUTING_CMD to the NFCC and configures the routing table RT02 for the NFCC; and if the NFCC supports setting a default routing target and has updated the default routing target, a new default routing target is designated at the same time. The DH sends an NFCEE_MODE_SET_CMD to the NFCC to deactivate all non-exclusive SEs currently in an activated state except an HCE, and activate the exclusive SE at the same time. It should be noted that there is no specific order for the foregoing operations of configuring a routing table by the DH and deactivating/activating an SE by the DH, and that no limitation is imposed by this embodiment of the present disclosure.

405. Check whether setting a default routing entry is supported.

If setting a default routing entry is not supported, step 406 is performed; and if setting a default routing entry is supported, step 407 is performed.

406. Construct a routing table that includes only the routing entry corresponding to the exclusive SE.

The DH of the terminal device constructs a new routing table, where only a routing entry corresponding to an application that belongs to the exclusive SE is configured, and routing entries corresponding to applications that belong to another SE and an HCE are not included.

The DH sends an RF_SET_LISTEN_MODE_ROUTING_CMD to the NFCC and configures the foregoing routing table for the NFCC; and if the NFCC supports setting a default routing target, the exclusive SE is set as the default routing target at the same time. After the DH receives an RSP, the DH sets a Flag value to 1, and records an NFCEE ID, that is, PT_SE_ID of the exclusive SE. The DH sends an NFCEE_MODE_SET_CMD to the NFCC to deactivate all non-exclusive SEs currently in the activated state except the HCE, and activate the exclusive SE at the same time.

407. Set the newly connected SE as the default routing target SE, where the constructed routing table may include or not include the routing entry corresponding to the exclusive SE.

More specifically, the DH constructs a new routing table, where only a routing entry corresponding to an application that belongs to the exclusive SE is configured, or no routing entry is included. The exclusive SE is set as the default routing target.

The DH sends an RF_SET_LISTEN_MODE_ROUTING_CMD to the NFCC and configures the foregoing routing table for the NFCC; and if the NFCC supports setting a default routing target, the exclusive SE is set as the default routing target at the same time. When the DH receives an RSP, the DH sets the Flag value to 1, and records the NFCEE ID, that is, PT_SE_ID of the exclusive SE. The DH sends an NFCEE_MODE_SET_CMD to the NFCC to deactivate all non-exclusive SEs currently in the activated state except the HCE, and activate the exclusive SE at the same time.

According to the route setting method and terminal device provided in this embodiment of the present disclosure, after an exclusive SE is connected to the terminal, running of all non-exclusive SEs including an HCE can be terminated by setting a routing table. Compared with the prior art in which running of an HCE cannot be terminated using an instruction, the method and terminal device provided in the present disclosure can avoid use of an HCE, thereby ensuring normal running of a newly connected exclusive SE.

Embodiment 5

Figure 5:
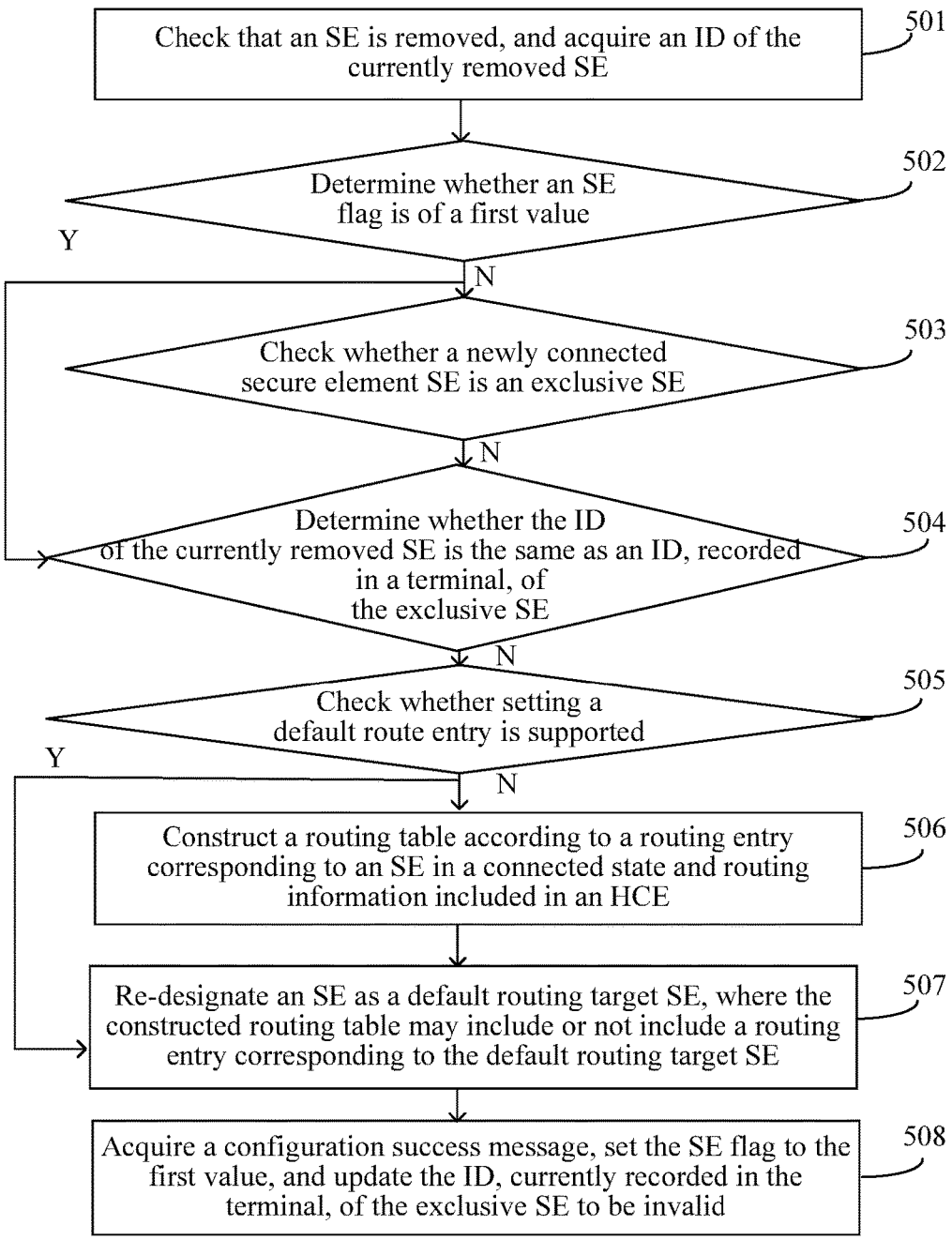
FIG. 5 is a schematic flowchart of a route setting method according to Embodiment 5 of the present disclosure.

An embodiment of the present disclosure provides a route setting method, applied to a terminal device whose NFCC does not have a capability of deleting a routing table. As shown in FIG. 5, the method includes the following steps.

501. Detect that an SE is removed, and acquire an ID of the currently removed SE.

If a DH or NFCC of the terminal device detects that an SE is removed, the DH acquires, from an NFCEE_DISCOVER_NTF sent by the NFCC, an ID corresponding to an SE whose NFCEE Status value is 0x02 (that is, an NFCEE ID of the currently removed SE).

502. Determine whether an SE flag is of a second value.

If the SE flag is not of the second value, step 503 is performed; and if the SE flag is of the second value, step 504 is performed.

The DH of the terminal device determines whether the NFCEE ID of the removed SE is equal to PT_SE_ID.

503. Delete a routing entry corresponding to the currently removed SE from a current routing table, determine, when setting a default routing entry is supported, whether the currently removed SE is a default routing target SE, and if the currently removed SE is the default routing target SE, re-designate an SE as the default routing target SE.

Different from the implementation manner of deleting a route in Embodiment 4, herein, the DH deletes the routing entry corresponding to this SE from the routing table to construct a new routing table, and configures the new routing table for the NFCC; and if the NFCC supports setting a default route SE, it is determined whether the default route SE needs to be set again, and the new routing table may include or not include a routing entry corresponding to the default route SE.

504. Determine whether the ID of the currently removed SE is the same as an ID, recorded in the terminal, of an exclusive SE.

If the ID of the currently removed SE is the same as the ID, recorded in the terminal, of an exclusive SE, configuration processing does not need to be performed; and if the ID of the currently removed SE is different from the ID, recorded in the terminal, of an exclusive SE, step 505 is performed.

505. Check whether setting a default routing entry is supported.

If setting a default routing entry is supported, step 507 is performed; and if setting a default routing entry is not supported, step 506 is performed.

506. Construct a routing table according to a routing entry corresponding to an SE in a connected state and routing information included in an HCE.

In implementation, the DH constructs the routing table according to routing information included in the connected SE and the HCE, where the routing table includes the routing information corresponding to the connected SE and the HCE.

The DH sends an RF_SET_LISTEN_MODE_ROUTING_CMD to the NFCC and configures the constructed routing table for the NFCC; and if the NFCC supports setting a default routing target, another default routing target is set at the same time. The DH sends an NFCEE_MODE_SET_CMD to the NFCC to activate a part of/all non-exclusive SEs according to a requirement.

507. Re-designate an SE as the default routing target SE, where the constructed routing table may include or not include a routing entry corresponding to the default routing target SE.

Then, the DH sends an NFCEE_MODE_SET_CMD to the NFCC to activate a part of/all non-exclusive SEs according to a requirement.

508. Acquire a configuration success message, set the SE flag to a first value, and update the ID, currently recorded in the terminal, of an exclusive SE to be invalid.

After receiving an RSP that feeds back a configuration success, the DH sets a Flag value to 0 and sets PT_SE_ID to N/A.

According to the route setting method provided in this embodiment of the present disclosure, after an exclusive SE is connected to a terminal, running of all non-exclusive SEs including an HCE can be terminated by setting a routing table. Compared with the prior art in which running of an HCE cannot be terminated using an instruction, the method and terminal device provided in the present disclosure can avoid use of an HCE, thereby ensuring normal running of a newly connected exclusive SE.

Embodiment 6

Figure 6:
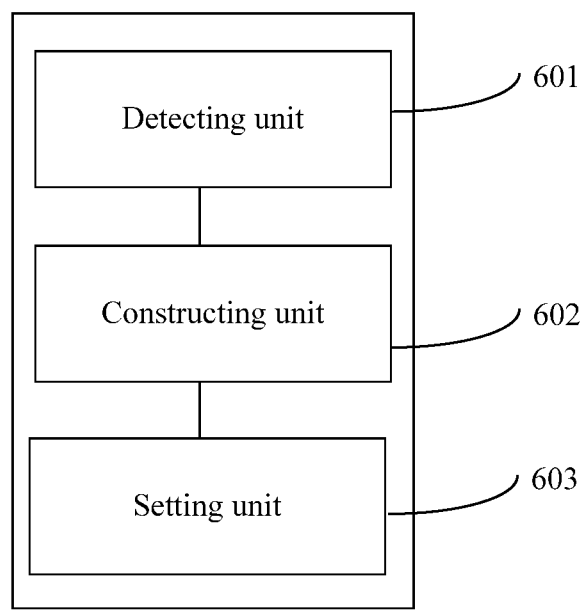
FIG. 6 is a structural block diagram of a terminal device according to Embodiment 6 of the present disclosure.

An embodiment of the present disclosure provides a terminal device. As shown in FIG. 6, the terminal device includes a detecting unit 601, a constructing unit 602 and a setting unit 603.

The detecting unit 601 is configured to check whether a newly connected SE is an exclusive SE.

The detecting unit 601 is further configured to, after it is detected that the newly connected SE is an exclusive SE, check whether setting a default routing entry is supported.

The constructing unit 602 is configured to, after the detecting unit 601 detects that setting a default routing entry is not supported, construct a routing table that includes only a routing entry corresponding to the exclusive SE.

The setting unit 603 is configured to, after the detecting unit 601 detects that setting a default routing entry is supported, set the newly connected SE as a default routing target SE, where the constructed routing table may include or not include the routing entry corresponding to the exclusive SE.

The setting unit 603 is further configured to, if the newly connected SE is not an exclusive SE, set an SE flag to a first value, and if the newly connected SE is an exclusive SE, set the SE flag to a second value and record an ID of the newly connected SE, where the first value indicates that currently no exclusive SE is connected to the terminal, and the second value indicates that currently an exclusive SE is connected to the terminal.

The setting unit 603 is further configured to set the SE flag, where an initial value of the SE flag is a first value.

The terminal device further includes a determining unit configured to determine whether the SE flag is of the first value; and an acquiring unit configured to, if the determining unit determines that the SE flag is of the first value, acquire a current routing table.

The constructing unit 602 is further configured to, after the detecting unit 601 detects that the newly connected SE is not an exclusive SE, add a routing entry corresponding to the newly connected SE to the current routing table to construct a routing table.

The determining unit is further configured to, when the detecting unit 601 detects that setting a default routing entry is supported, determine whether the default routing target SE needs to be re-designated, where the constructed routing table may include or not include a routing entry corresponding to the default routing target SE.

If an NFCC of the terminal device is capable of deleting a routing entry, the detecting unit 601 is further configured to check whether an HCE exists in the terminal device.

The constructing unit 602 is further configured to, if the detecting unit 601 detects that no HCE exists in the terminal device, when setting a default routing entry is not supported, add the routing entry corresponding to the newly connected exclusive SE to the current routing table to construct a routing table, where if setting a default routing entry is supported, the constructed routing table may include or not include the routing entry corresponding to the newly connected exclusive SE.

The detecting unit 601 is further configured to, if it is detected that an HCE exists in the terminal device, check whether the routing table includes a routing entry whose target is the HCE.

The constructing unit 602 is further configured to, if the detecting unit 601 detects that the routing table does not include the routing entry whose target is the HCE, when setting a default routing entry is not supported, add the routing entry corresponding to the newly connected exclusive SE to the current routing table to construct a routing table, where if setting a default routing entry is supported, the constructed routing table may include or not include the routing entry corresponding to the newly connected exclusive SE.

The constructing unit 602 is further configured to, if the detecting unit 601 detects that the routing table includes the routing entry whose target is the HCE, delete, when the detecting unit 601 detects that setting a default routing entry is not supported, a routing entry corresponding to the HCE and that corresponding to a non-exclusive SE from the routing table and write the routing entry corresponding to the newly connected SE to construct a routing table that includes only the routing entry corresponding to the newly connected exclusive SE, where if setting a default routing entry is supported, the constructed routing table may include or not include the routing entry corresponding to the newly connected exclusive SE.

The detecting unit 601 is further configured to check whether an SE is removed.

The acquiring unit is further configured to, after the detecting unit detects that an SE is removed, acquire an ID of the currently removed SE.

The determining unit is further configured to determine whether the SE flag is of the second value.

The determining unit is further configured to, if the SE flag is of the second value, determine whether the ID of the currently removed SE is the same as an ID, recorded in the terminal, of the exclusive SE.

The constructing unit 602 is further configured to, if the determining unit determines that the ID of the currently removed SE is the same as the ID, recorded in the terminal, of the exclusive SE, construct a routing table according to a routing entry corresponding to an SE in a connected state and routing information included in the HCE.

The detecting unit 601 is further configured to check whether setting a default routing entry is supported.

The constructing unit 602 is further configured to, if the detecting unit 601 detects that setting a default routing entry is supported, construct a routing table that includes or does not include the routing entry corresponding to the default routing target SE.

The setting unit 603 is further configured to, after the detecting unit 601 detects that setting a default routing entry is supported, re-designate an SE as the default routing target SE.

The acquiring unit is further configured to acquire a configuration success message.

The setting unit 603 is further configured to set the SE flag to the first value and update the ID, currently recorded in the terminal, of the exclusive SE to be invalid.

The constructing unit 602 is further configured to, if the determining unit determines that the SE flag is not of the second value, delete a routing entry corresponding to the currently removed SE from the current routing table.

The determining unit is further configured to, when setting a default routing entry is supported, determine whether the currently removed SE is the default routing target SE.

The determining unit is further configured to, when it is determined that setting a default routing entry is supported, determine whether the currently removed SE is the default routing target SE.

The setting unit 603 is further configured to, after the determining unit determines that the currently removed SE is the default routing target SE, re-designate an SE as the default routing target SE.

If the NFCC of the terminal device is capable of deleting a routing entry, the detecting unit 601 is further configured to check whether an HCE exists in the terminal device.

The constructing unit 602 is further configured to construct a routing table according to a routing entry corresponding to an SE in a connected state.

The detecting unit 601 is further configured to check whether setting a default routing entry is supported.

The setting unit 603 is further configured to, after it is detected that setting a default routing entry is supported, re-designate an SE as the default routing target SE, where the constructed routing table may include or not include a routing entry corresponding to the default routing target SE.

The acquiring unit is further configured to acquire a configuration success message.

The setting unit 603 is further configured to set the SE flag to the first value and update the ID, currently recorded in the terminal, of the exclusive SE to be invalid.

The detecting unit 601 is further configured to, if an HCE exists in the terminal device, check whether the current routing table includes the routing entry whose target is the HCE.

The constructing unit 602 is further configured to, after the detecting unit 601 detects that the current routing table includes the routing entry whose target is the HCE, construct a routing table according to the routing entry corresponding to the SE in a connected state and the routing entry corresponding to the HCE.

The detecting unit 601 is further configured to check whether setting a default routing entry is supported.

The setting unit 603 is further configured to, if the detecting unit 601 detects that setting a default routing entry is supported, re-designate an SE as the default routing target SE, where the constructed routing table may include or not include a routing entry corresponding to the default routing target SE.

The acquiring unit is further configured to acquire a configuration success message.

The setting unit 603 is further configured to set the SE flag to the first value and update the ID, currently recorded in the terminal, of the exclusive SE to be invalid.

The detecting unit 601 is further configured to, after it is detected that the current routing table does not include the routing entry whose target is the HCE, check whether the current routing table includes any routing entry corresponding to a non-exclusive SE.

The constructing unit 602 is further configured to, after the detecting unit 601 detects that the current routing table includes a routing entry corresponding to a non-exclusive SE, delete the routing entry corresponding to the currently removed exclusive SE to construct a routing table.

The detecting unit 601 is further configured to check whether setting a default routing entry is supported.

The setting unit 603 is further configured to, if the detecting unit 601 detects that setting a default routing entry is supported, re-designate an SE as the default routing target SE, where the constructed routing table may include or not include a routing entry corresponding to the default routing target SE.

The acquiring unit is further configured to acquire a configuration success message.

The setting unit 603 is further configured to set the SE flag to the first value and update the ID, currently recorded in the terminal, of the exclusive SE to be invalid.

The constructing unit 602 is further configured to, if the current routing table does not include any routing entry corresponding to a non-exclusive SE, construct a routing table according to a routing entry corresponding to an SE in a connected state and the routing information included in the HCE.

The detecting unit 601 is further configured to check whether setting a default routing entry is supported.

The setting unit 603 is further configured to, if the detecting unit 601 detects that setting a default routing entry is supported, re-designate an SE as the default routing target SE, where the constructed routing table may include or not include a routing entry corresponding to the default routing target SE.

The acquiring unit is further configured to acquire a configuration success message.

The setting unit 603 is further configured to set the SE flag to the first value and update the ID, currently recorded in the terminal, of the exclusive SE to be invalid.

According to the terminal device provided in this embodiment of the present disclosure, after an exclusive SE is connected to the terminal, running of all non-exclusive SEs including an HCE can be terminated by setting a routing table. Compared with the prior art in which running of an HCE cannot be terminated using an instruction, the method and terminal device provided in the present disclosure can avoid use of an HCE, thereby ensuring normal running of a newly connected exclusive SE.

Embodiment 7

Figure 7:
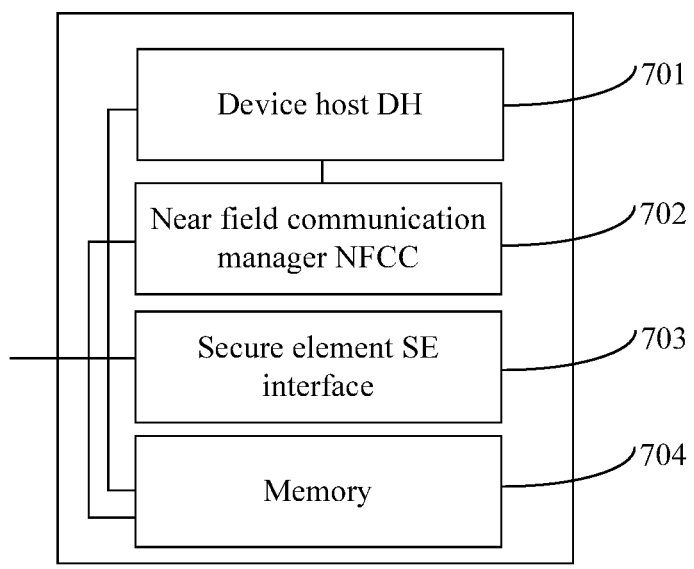
FIG. 7 is a structural block diagram of a terminal device according to Embodiment 7 of the present disclosure.

An embodiment of the present disclosure provides a terminal device. As shown in FIG. 7, the terminal device includes a DH 701, and the terminal device includes and further includes an NFCC 702, an SE interface 703 and a memory 704, where the memory stores a routing table.

The DH 701 is configured to check whether a newly connected SE is an exclusive SE.

The DH 701 is further configured to, after it is detected that the newly connected SE is an exclusive SE, check whether setting a default routing entry is supported.

The DH 701 is further configured to, after it is detected that setting a default routing entry is not supported, construct a routing table that includes only a routing entry corresponding to the exclusive SE.

The DH 701 is configured to, after it is detected that setting a default routing entry is supported, set the newly connected SE as a default routing target SE, where the constructed routing table may include or not include the routing entry corresponding to the exclusive SE.

The DH 701 is further configured to, if the newly connected SE is not an exclusive SE, set an SE flag to a first value, and if the newly connected SE is an exclusive SE, set the SE flag to a second value and record an ID of the newly connected SE, where the first value indicates that currently no exclusive SE is connected to the terminal, and the second value indicates that currently an exclusive SE is connected to the terminal.

The DH 701 is further configured to set the SE flag, where an initial value of the SE flag is a first value.

The DH 701 is configured to, if it is determined that the SE flag is of the first value, acquire a current routing table.

The DH 701 is further configured to, after it is detected that the newly connected SE is not an exclusive SE, add a routing entry corresponding to the newly connected SE to the current routing table to construct a routing table.

The DH 701 is further configured to, when it is detected that setting a default routing entry is supported, determine whether the default routing target SE needs to be re-designated, where the constructed routing table may include or not include a routing entry corresponding to the default routing target SE.

If the NFCC 702 of the terminal device is capable of deleting a routing entry, the DH 701 is further configured to check whether an HCE exists in the terminal device.

The DH 701 is further configured to, if it is detected that no HCE exists in the terminal device, when setting a default routing entry is not supported, add the routing entry corresponding to the newly connected exclusive SE to the current routing table to construct a routing table, where if setting a default routing entry is supported, the constructed routing table may include or not include the routing entry corresponding to the newly connected exclusive SE.

The DH 701 is further configured to, if it is detected that an HCE exists in the terminal device, check whether a routing table includes the routing entry whose target is the HCE.

The DH 701 is further configured to, if it is detected that the routing table does not include the routing entry whose target is the HCE, when setting a default routing entry is not supported, add the routing entry corresponding to the newly connected exclusive SE to the current routing table to construct a routing table, where if setting a default routing entry is supported, the constructed routing table may include or not include the routing entry corresponding to the newly connected exclusive SE.

The DH 701 is further configured to, if it is detected that the routing table includes the routing entry whose target is the HCE, when it is detected that setting a default routing entry is not supported, delete routing entries corresponding to the HCE and a non-exclusive SE from the routing table and write the routing entry corresponding to the newly connected SE to construct a routing table that includes only the routing entry corresponding to the newly connected exclusive SE, where if setting a default routing entry is supported, the constructed routing table may include or not include the routing entry corresponding to the newly connected exclusive SE.

The DH 701 is further configured to check whether an SE is removed.

The DH 701 is further configured to, after it is detected that an SE is removed, acquire an ID of the currently removed SE.

The DH 701 is further configured to determine whether the SE flag is of the second value.

The DH 701 is further configured to, if the SE flag is of the second value, determine whether the ID of the currently removed SE is the same as an ID, recorded in the terminal, of the exclusive SE.

The DH 701 is further configured to, if the determining unit determines that the ID of the currently removed SE is the same as the ID, recorded in the terminal, of the exclusive SE, construct a routing table according to a routing entry corresponding to an SE in a connected state and routing information included in an HCE.

The DH 701 is further configured to check whether setting a default routing entry is supported.

The DH 701 is further configured to, if it is detected that setting a default routing entry is supported, construct a routing table that includes or does not include the routing entry corresponding to the default routing target SE.

The DH 701 is further configured to, after it is detected that setting a default routing entry is supported, re-designate an SE as the default routing target SE.

The DH 701 is further configured to acquire a configuration success message.

The DH 701 is further configured to set the SE flag to the first value and update the ID, currently recorded in the terminal, of the exclusive SE to be invalid.

The NFCC 702 is configured to, if it is determined that the SE flag is not of the second value, delete a routing entry corresponding to the currently removed SE from the current routing table.

The DH 701 is further configured to, if it is determined that the SE flag is not of the second value and the NFCC 702 of the terminal does not have a capability of deleting a route, delete the routing entry corresponding to the currently removed SE from the current routing table.

The DH 701 is further configured to, when setting a default routing entry is supported, determine whether the currently removed SE is the default routing target SE.

The DH 701 is further configured to, when it is determined that setting a default routing entry is supported, determine whether the currently removed SE is the default routing target SE.

The DH 701 is further configured to, after it is determined that the currently removed SE is the default routing target SE, re-designate an SE as the default routing target SE.

If the NFCC 702 of the terminal device is capable of deleting a routing entry, the DH 701 is further configured to check whether an HCE exists in the terminal device.

The DH 701 is further configured to construct a routing table according to a routing entry corresponding to an SE in a connected state.

The DH 701 is further configured to check whether setting a default routing entry is supported.

The DH 701 is further configured to, after it is detected that setting a default routing entry is supported, re-designate an SE as the default routing target SE, where the constructed routing table may include or not include a routing entry corresponding to the default routing target SE.

The DH 701 is further configured to acquire a configuration success message.

The DH 701 is further configured to set the SE flag to the first value and update the ID, currently recorded in the terminal, of the exclusive SE to be invalid.

The DH 701 is further configured to, if an HCE exists in the terminal device, check whether the current routing table includes the routing entry whose target is the HCE.

The DH 701 is further configured to, after it is detected that the current routing table includes the routing entry whose target is the HCE, construct a routing table according to the routing entry corresponding to the SE in a connected state and a routing entry corresponding to the HCE.

The DH 701 is further configured to check whether setting a default routing entry is supported.

The DH 701 is further configured to, if it is detected that setting a default routing entry is supported, re-designate an SE as the default routing target SE, where the constructed routing table may include or not include a routing entry corresponding to the default routing target SE.

The DH 701 is further configured to acquire a configuration success message.

The DH 701 is further configured to set the SE flag to the first value and update the ID, currently recorded in the terminal, of the exclusive SE to be invalid.

The DH 701 is further configured to, after it is detected that the current routing table does not include the routing entry whose target is the HCE, check whether the current routing table includes any routing entry corresponding to a non-exclusive SE.

The DH 701 is further configured to, after the detecting unit 601 detects that the current routing table includes a routing entry corresponding to a non-exclusive SE, delete the routing entry corresponding to the currently removed exclusive SE to construct a routing table.

The DH 701 is further configured to check whether setting a default routing entry is supported.

The DH 701 is further configured to, if the detecting unit 601 detects that setting a default routing entry is supported, re-designate an SE as the default routing target SE, where the constructed routing table may include or not include a routing entry corresponding to the default routing target SE.

The DH 701 is further configured to acquire a configuration success message.

The DH 701 is further configured to set the SE flag to the first value and update the ID, currently recorded in the terminal, of the exclusive SE to be invalid.

The DH 701 is further configured to, if the current routing table does not include any routing entry corresponding to a non-exclusive SE, construct a routing table according to a routing entry corresponding to an SE in a connected state and the routing information included in the HCE.

The DH 701 is further configured to check whether setting a default routing entry is supported.

The DH 701 is further configured to, if it is detected that setting a default routing entry is supported, re-designate an SE as the default routing target SE, where the constructed routing table may include or not include a routing entry corresponding to the default routing target SE.

The DH 701 is further configured to acquire a configuration success message.

The DH 701 is further configured to set the SE flag to the first value and update the ID, currently recorded in the terminal, of the exclusive SE to be invalid.

According to the terminal device provided in this embodiment of the present disclosure, after an exclusive SE is connected to the terminal, running of all non-exclusive SEs including an HCE can be terminated by setting a routing table. Compared with the prior art in which running of an HCE cannot be terminated using an instruction, the method and terminal device provided in the present disclosure can avoid use of an HCE, thereby ensuring normal running of a newly connected exclusive SE.

A person of ordinary skill in the art may understand that all or some of the steps of the foregoing method embodiments may be implemented by a program instructing relevant hardware. The foregoing program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A route setting method on a terminal device, comprising:
    checking, with a processor, whether a newly connected secure element (SE) is an exclusive SE, the exclusive SE being an SE installed on a universal integrated circuit card (UICC);
    checking, with the processor, whether setting a default routing entry is supported when the newly connected SE is a newly connected exclusive SE;
    when setting a default routing entry is not supported:
        writing, with the processor, a routing entry corresponding to the newly connected exclusive SE to a routing table to construct the routing table that comprises only the routing entry corresponding to the newly connected exclusive SE; and
        deleting, with the processor, a routing entry corresponding to a host-card emulator (HCE) from the routing table and a routing entry corresponding to a non-exclusive SE from the routing table when the routing table comprises a routing entry whose target is the HCE; and
    setting, with the processor, the newly connected exclusive SE as a default routing target SE when setting the default routing entry is supported to permit the UICC to be used as a secure environment on the terminal device.

2. The method of claim 1, wherein after checking whether the newly connected SE is an exclusive SE, the method further comprises:
    setting an SE flag to a first value when the newly connected SE is not an exclusive SE; and
    setting the SE flag to a second value and recording an identifier (ID) of the newly connected SE when the newly connected SE is the newly connected exclusive SE, wherein the first value indicates that currently no exclusive SE is connected to the terminal device, and wherein the second value indicates that currently an exclusive SE is connected to the terminal device.

3. The method of claim 1, further comprising:
    setting an SE flag to an initial value, wherein the initial value of the SE flag is a first value;
    determining, before checking whether the newly connected SE is the newly connected exclusive SE, whether the SE flag is of the first value; and
    acquiring a current routing table when the SE flag is of the first value.

4. The method of claim 3, wherein a routing entry corresponding to the newly connected SE is added to the current routing table to construct a routing table when the newly connected SE is not an exclusive SE, wherein it is determined, when setting a default routing entry is supported, whether the default routing target SE needs to be re-designated, and wherein constructing the routing table may comprise or not comprise a routing entry corresponding to the default routing target SE.

5. The method of claim 3, further comprising:
  detecting that an SE is currently removed;
  acquiring an ID of the currently removed SE;
  determining whether the SE flag is of a second value;
  determining, when the SE flag is of the second value, whether the ID of the currently removed SE is the same as an ID, recorded in the terminal device, of the exclusive SE;
  constructing, when the ID of the currently removed SE is the same as the ID of the exclusive SE, a routing table according to a routing entry corresponding to an SE in a connected state and routing information comprised in an HCE;
  checking whether setting the default routing entry is supported;
  re-designating an SE as the default routing target SE when setting the default routing entry is supported, wherein the constructed routing table includes a routing entry corresponding to the default routing target SE;
  acquiring a configuration success message;
  setting the SE flag to the first value; and
  updating the ID, currently recorded in the terminal device, of the exclusive SE to be invalid.

6. The method of claim 5, wherein the method further comprises:
  deleting a routing entry corresponding to the currently removed SE from the current routing table when the SE flag is not the second value;
  determining, when setting the default routing entry is supported, whether the currently removed SE is the default routing target SE; and
  re-designating an SE as the default routing target SE when the currently removed SE is the default routing target SE.

7. The method of claim 5, wherein when an NFCC of the terminal device is capable of deleting a routing entry, and after it is determined that the ID of the currently removed SE is the same as the ID of the exclusive SE, the method further comprises:
  checking whether an HCE exists in the terminal device;
  constructing a routing table according to a routing entry corresponding to an SE in a connected state when no HCE exists in the terminal device;
  checking whether setting the default routing entry is supported;
  re-designating an SE as the default routing target SE when setting the default routing entry is supported, wherein the constructed routing table includes the routing entry corresponding to the default routing target SE;
  acquiring a configuration success message;
  setting the SE flag to the first value; and
  updating the ID, currently recorded in the terminal device, of the exclusive SE to be invalid.

8. The method of claim 1, wherein when a near field communication controller (NFCC) of the terminal device is capable of deleting a routing entry, and after checking whether the newly connected SE is an exclusive SE, the method further comprises:
  checking whether the HCE exists in the terminal device; and
  adding, when no HCE exists in the terminal device and when setting a default routing entry is not supported, the routing entry corresponding to the newly connected exclusive SE to a current routing table to construct a routing table, wherein constructing the routing table includes the routing entry corresponding to the newly connected exclusive SE when setting the default routing entry is supported.

9. The method of claim 8, further comprising:
  checking, when an HCE exists in the terminal device, whether the routing table comprises a routing entry whose target is the HCE; and
  adding the routing entry corresponding to the newly connected exclusive SE to the current routing table to construct a routing table when the routing table does not comprise the routing entry whose target is the HCE, and when setting the default routing entry is not supported, the routing entry corresponding to the newly connected exclusive SE is added, wherein when setting a default routing entry is supported, wherein constructing the routing table includes the routing entry corresponding to the newly connected exclusive SE.

10. A terminal device, comprising:
  a memory comprising instructions; and
  a device host (DH) coupled to the memory, wherein the instructions cause the DH to be configured to:
    check whether a newly connected secure element (SE) is an exclusive SE, the exclusive SE being an SE installed on a universal integrated circuit card (UICC);
    check, after it is detected that the newly connected SE is a newly connected exclusive SE, whether setting a default routing entry is supported;
    when setting a default routing entry is not supported:
      write a routing entry corresponding to the newly connected exclusive SE to a routing table to construct the routing table that comprises only the routing entry corresponding to the newly connected exclusive SE; and
      delete a routing entry corresponding to a host-card emulator (HCE) from the routing table and a routing entry corresponding to a non-exclusive SE from the routing table when the routing table comprises a routing entry whose target is the HCE; and
    set the newly connected exclusive SE as a default routing target SE after it is detected that setting the default routing entry is supported to permit the UICC to be used as a secure environment on the terminal device.

11. The terminal device of claim 10, wherein the instructions further cause the DH to be configured to:
  set an SE flag to a first value when the newly connected SE is not the exclusive SE; and
  set, when the newly connected SE is the newly connected exclusive SE, the SE flag to a second value and record an identifier (ID) of the newly connected exclusive SE, wherein the first value indicates that currently no exclusive SE is connected to the terminal device, and wherein the second value indicates that currently an exclusive SE is connected to the terminal device.

12. The terminal device of claim 10, wherein the instructions further cause the DH to be configured to:
  set an SE flag to an initial value, wherein the initial value of the SE flag is a first value;
  determine whether the SE flag is of the first value; and
  acquire a current routing table when it is determined that the SE flag is of the first value.

13. The terminal device of claim 12, wherein the instructions further cause the DH to be configured to:
   add a routing entry corresponding to the newly connected SE to the current routing table to construct a routing table after it is detected that the newly connected SE is not an exclusive SE; and
   determine whether the default routing target SE needs to be re-designated when it is detected that setting a default routing entry is supported, wherein the routing table includes a routing entry corresponding to the default routing target SE.

14. The terminal device of claim 12, wherein the DH is further configured to:
   check whether an SE is currently removed;
   acquire an ID of the currently removed SE after it is detected that an SE is removed;
   determine whether the SE flag is of a second value;
   determine, when the SE flag is of the second value, whether the ID of the currently removed SE is the same as an ID, recorded in the terminal device, of the exclusive SE;
   construct, when it is determined that the ID of the currently removed SE is the same as the ID of the exclusive SE, a routing table according to a routing entry corresponding to an SE in a connected state and routing information comprised in an HCE;
   check whether setting the default routing entry is supported;
   construct, when it is detected that setting the default routing entry is supported, a routing table that includes a routing entry corresponding to the default routing target SE;
   re-designate an SE as the default routing target SE after it is detected that setting the default routing entry is supported;
   acquire a configuration success message; and
   set the SE flag to the first value and update the ID, currently recorded in the terminal device, of the exclusive SE to be invalid.

15. The terminal device of claim 14, wherein the DH is further configured to:
   delete a routing entry corresponding to the currently removed SE from the current routing table when it is determined that the SE flag is not of the second value;
   determine whether the currently removed SE is a default routing target SE when it is determined that setting a default routing entry is supported; and
   re-designate the SE as the default routing target SE after it is determined that the currently removed SE is the default routing target SE.

16. The terminal device of claim 14, wherein when an NFCC of the terminal device is capable of deleting a routing entry, the DH is further configured to:
   check whether an HCE exists in the terminal device;
   construct a routing table according to a routing entry corresponding to an SE in a connected state when no HCE exists in the terminal device;
   check whether setting the default routing entry is supported;
   re-designate the SE as the default routing target SE after it is detected that setting a default routing entry is supported, wherein the routing table includes the routing entry corresponding to the default routing target SE;
   acquire a configuration success message; and
   set the SE flag to the first value and update the ID, currently recorded in the terminal device, of the exclusive SE to be invalid.

17. The terminal device of claim 10, wherein, when a near field communication controller (NFCC) of the terminal device is capable of deleting a routing entry, the instructions further cause the DH to be configured to:
   check whether a host card emulator (HCE) exists in the terminal device; and
   add the routing entry corresponding to the newly connected exclusive SE to a current routing table to construct a routing table when it is detected that no HCE exists in the terminal device, and when setting the default routing entry is not supported, wherein, when setting a default routing entry is supported, the routing table includes the routing entry corresponding to the newly connected exclusive SE.

18. The terminal device of claim 17, wherein the instructions further cause the DH to be configured to:
   check whether a routing table comprises the routing entry whose target is the HCE when it is detected that an HCE exists in the terminal device; and
   add the routing entry corresponding to the newly connected exclusive SE to the current routing table to construct a routing table when it is detected that the routing table does not comprise the routing entry whose target is the HCE, and when setting the default routing entry is not supported, wherein, when setting the default routing entry is supported, the routing table includes the routing entry corresponding to the newly connected exclusive SE.

* * * * *